(12) United States Patent
Toida et al.

(10) Patent No.: US 12,174,630 B2
(45) Date of Patent: Dec. 24, 2024

(54) DISPLAY DEVICE AND ROUTE DISPLAY PROGRAM

(71) Applicant: SUMITOMO HEAVY INDUSTRIES CONSTRUCTION CRANES CO., LTD., Tokyo (JP)

(72) Inventors: Minoru Toida, Tokyo (JP); Hironori Matsuura, Aichi (JP); Katsuaki Kamashima, Tokyo (JP); Yu Ikeda, Tokyo (JP); Hiroyuki Tomioka, Aichi (JP)

(73) Assignee: Sumitomo Heavy Industries Construction Cranes Co., Ltd., Tokyo (JP)

( * ) Notice: Subject to any disclaimer, the term of this patent is extended or adjusted under 35 U.S.C. 154(b) by 0 days.

(21) Appl. No.: 17/710,246

(22) Filed: Mar. 31, 2022

(65) Prior Publication Data

US 2022/0317684 A1 Oct. 6, 2022

(30) Foreign Application Priority Data

Mar. 31, 2021 (JP) .................. 2021-058958

(51) Int. Cl.
*G05D 1/00* (2024.01)
*B64U 101/26* (2023.01)
*B64U 101/30* (2023.01)

(52) U.S. Cl.
CPC ......... *G05D 1/0038* (2013.01); *G05D 1/0044* (2013.01); *G05D 1/101* (2013.01);
(Continued)

(58) Field of Classification Search
None
See application file for complete search history.

(56) References Cited

U.S. PATENT DOCUMENTS 9,865,172 B2    1/2018  Takahashi et al.
2014/0125651 A1*  5/2014  Sharp .................. G01C 15/00
                                          345/419
(Continued)

FOREIGN PATENT DOCUMENTS

JP    2003-130675 A    5/2003
JP    2019-032234 A    2/2019
(Continued)

OTHER PUBLICATIONS

Juan A. Besada et al., "Drone Mission Definition and Implementation for Automated Infrastructure Inspection Using Airborne Sensors", Sensors 2018, 18, 1170, published Apr. 11, 2018, 29 pages, DOI: 10.3390/s18041170, MDPI.
(Continued)

*Primary Examiner* — Jelani A Smith
*Assistant Examiner* — Davin Seol
(74) *Attorney, Agent, or Firm* — Michael Best & Friedrich LLP

(57) ABSTRACT

A display device includes a display unit, and a control unit that displays a flight route of a flying object flying while photographing surroundings of a crane on the display unit. The control unit is configured to display the crane and the flight route on the display unit, and to display the flight route in a display mode viewed from at least two different directions.

17 Claims, 14 Drawing Sheets

(52) U.S. Cl.
    CPC ...... *B64U 2101/26* (2023.01); *B64U 2101/30* (2023.01); *B64U 2201/20* (2023.01)

(56) References Cited

U.S. PATENT DOCUMENTS

| | | |
|---|---|---|
| 2017/0076612 A1 | 3/2017 | Takahashi et al. |
| 2018/0002010 A1* | 1/2018 | Bauer ................. G08G 5/0069 |
| 2018/0262674 A1* | 9/2018 | Iwakura ............... H04N 17/002 |
| 2019/0016569 A1* | 1/2019 | Palberg ................ G05D 1/0094 |
| 2020/0082623 A1* | 3/2020 | Gray ................... G08G 5/0034 |
| 2020/0117201 A1* | 4/2020 | Oetken ................ G05D 1/0214 |
| 2020/0180763 A1* | 6/2020 | Schütz ................. B64C 39/024 |
| 2022/0041411 A1 | 2/2022 | Toida et al. |

FOREIGN PATENT DOCUMENTS

| | | |
|---|---|---|
| JP | 6730764 B1 | 7/2020 |
| JP | 2020-147141 A | 9/2020 |
| JP | 2021-012721 A | 2/2021 |
| WO | WO-2020/218433 A1 | 10/2020 |
| WO | 2021/203940 A1 | 10/2021 |

OTHER PUBLICATIONS

Search Report issued in European Application No. 22165438.7, mailed Sep. 2, 2022.
Japanese Office Action dated Jul. 23, 2024 for the corresponding Japanese Patent Application No. 2021-058958, with English machine translation.

\* cited by examiner

DISPLAY DEVICE AND ROUTE DISPLAY PROGRAM

RELATED APPLICATIONS

The content of Japanese Patent Application No. 2021-058958, on the basis of which priority benefits are claimed in an accompanying application data sheet, is in its entirety incorporated herein by reference.

BACKGROUND

Technical Field

Certain embodiments of the present invention relate to a display device and a route display program.

Description of Related Art

In the related art, a technique for inspecting a crane by flying a flying object such as a drone around the crane is known (for example, refer to the related art).

SUMMARY

According to an embodiment of the present invention, there is provided a display device including a display unit, and a control unit that displays a flight route of a flying object flying while photographing surroundings of a crane on the display unit.

The control unit is configured to display the crane and the flight route on the display unit, and to display the flight route in a display mode viewed from at least two different directions.

According to another embodiment of the present invention, there is provided a non-transitory computer readable medium storing a route display program that displays a flight route of a flying object flying while photographing surroundings of a crane on a display unit, the program causes a computer to function as a display control unit that displays the flight route in a display mode viewed from at least two different directions, in a case in which the crane and the flight route are displayed on the display unit.

DETAILED DESCRIPTION

Incidentally, the crane has a complicated structure having many complicated members such as ropes and booms as compared with a structure such as a building. Therefore, it is difficult to accurately confirm a flight route of the flying object flying around it.

The present invention has been made in view of the above circumstances, and it is desirable to make it possible to easily and accurately confirm the flight route of the flying object as compared with the related art.

Hereinafter, an embodiment of the present invention will be described in detail with reference to the drawings.

Outline of Crane Inspection System

Figure 1:
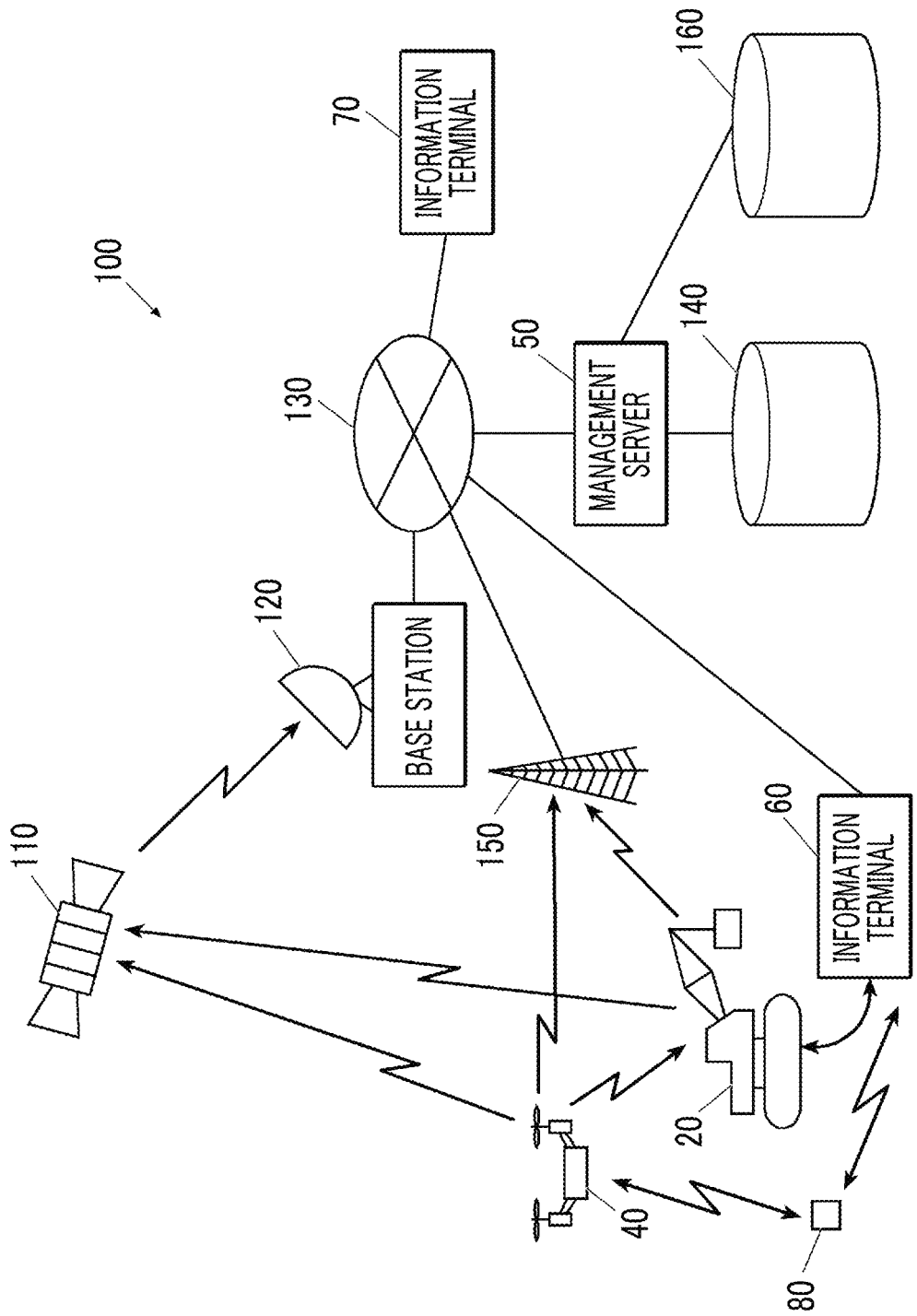
FIG. 1 is a diagram illustrating an outline of a crane inspection system according to an embodiment.

FIG. 1 is a diagram illustrating an outline of a crane inspection system (hereinafter, simply referred to as "inspection system") 100 according to the embodiment of the present invention.

As illustrated in FIG. 1, the inspection system 100 includes a crane 20 which is an inspection target, a moving body 40 moving surroundings of the crane 20, and information terminals 60 and 70 that performs predetermined processing on data acquired by the moving body 40, a management server 50, and a remote controller 80.

The management server 50 is connected to a network 130 such as a general public network.

In addition to the management server 50, base stations 120 and 150, the information terminals 60 and 70, and the like are connected to the network 130. The management server 50 can exchange data with nodes connected to the network 130, that is, the base stations 120 and 150, the moving body 40, and a plurality of the information terminals 60 and 70.

The remote controller 80 is configured to communicate with the moving body 40 and the information terminal 60, and mediates transmission and reception of information between them (for example, image information acquired by the moving body 40). In addition, the remote controller 80 is configured to control an operation of the moving body 40, and, for example, it is possible to manually operate the moving body 40.

The base station 120 is a base station of a satellite communication line capable of transmitting and receiving radio waves via a satellite 110, and the base station 150 is a base station of a so-called mobile phone communication line.

When the base stations 120 and 150 receive various data from the moving body 40, the crane 20, and the like, the base stations 120 and 150 transmit the data to the management server 50 via the network 130.

The crane 20 has various sensors for detecting a state of each part of the crane 20 itself and a controller 31 as will be described later (refer to FIG. 4). The controller 31 transmits information detected by the various sensors to the base stations 120 and 150 by a first communication unit 351 and a second communication unit 352 (refer to FIG. 4), and receives predetermined information.

An inspection information database 140 and a customer information database 160 are connected to the management server 50. A control device 51 (refer to FIG. 5) included in the management server 50 causes the inspection information database 140 to store diagnostic information data (to be described later) received from the moving body 40 and the crane 20 via the base stations 120 and 150, and state information data generated from the diagnostic information data.

The control device 51 included in the management server 50 transmits the state information data stored in the inspection information database 140 to the predetermined information terminals 60 and 70 via the network 130. The control device 51 included in the management server 50 determines a transmission destination of information based on contents of the customer information database 160. The information is transmitted, for example, to the information terminal 60 used by a site supervisor who is a user of the crane 20, a serviceman of a crane manufacturer, and the like or to the information terminal 70 used by an administrator who is a business-involved user using the crane 20 at a place away from the site, and is displayed on a display screen of the information terminals 60 and 70.

Although FIG. 1 illustrates only one for the crane 20, the information terminals 60 and 70, the management server 50 is actually configured to transmit and receive the information between a large number of cranes 20 and a large number of information terminals 60 and 70.

Moving Body

Here, the moving body 40 will be described.

Figure 2:
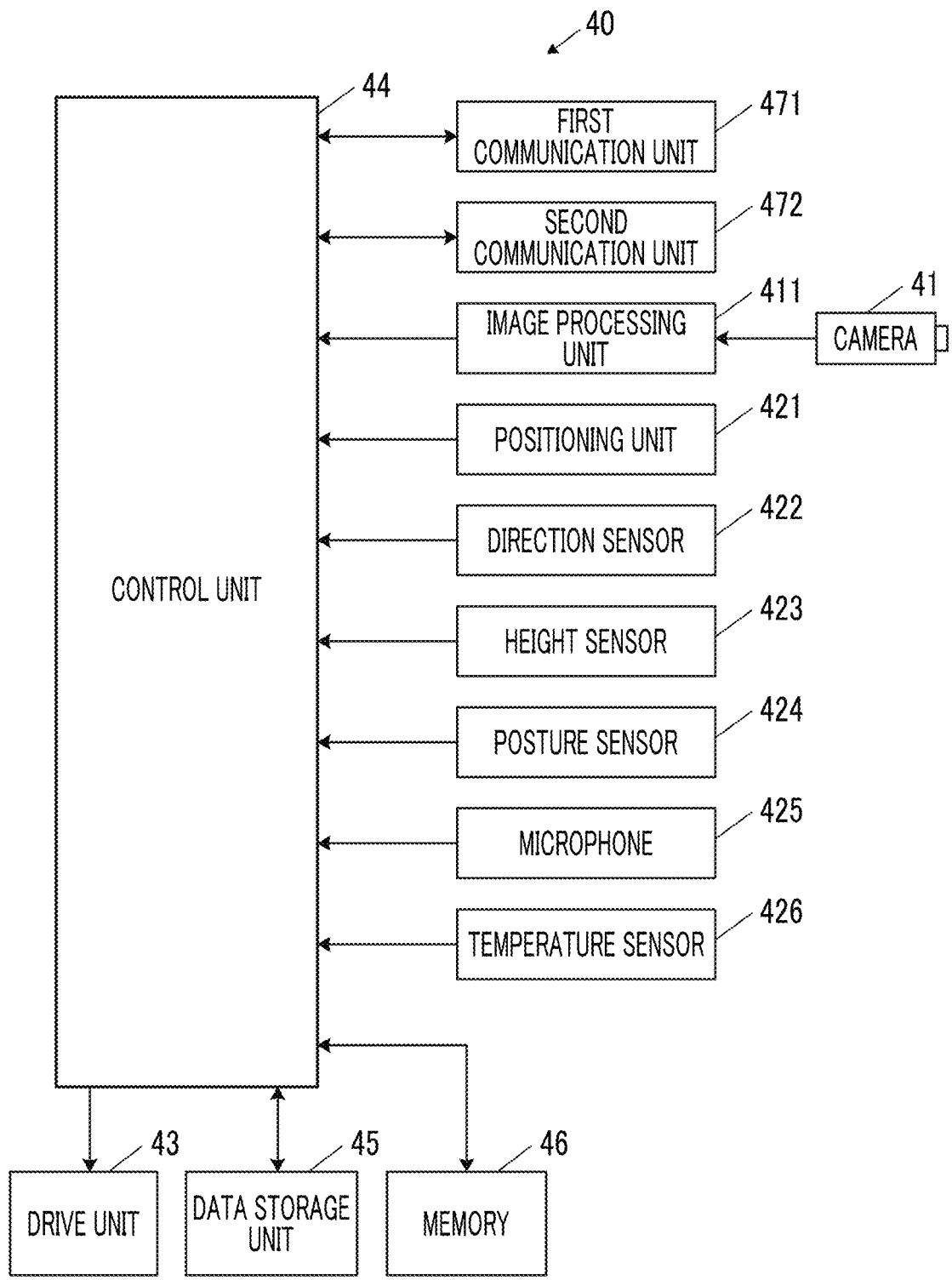
FIG. 2 is a block diagram illustrating a control system of a moving body.

FIG. 2 is a block diagram showing a control system of the moving body 40.

The moving body 40 has a plurality of rotors, can fly by controlling output of a motor that is a drive source of each rotor, and can freely perform raising/lowering operations, forward/backward/rightward/leftward movements, positive/negative turning, and the like. It is a flying object so-called drone (unmanned aerial vehicle).

The moving body 40 moves the surroundings of the crane 20 which is an inspection target, images each part thereof, and transmits the acquired captured image data to the predetermined information terminals 60 and 70 and the management server 50.

As illustrated in FIG. 2, the moving body 40 includes a camera 41 serving as imaging means, a positioning unit 421, a direction sensor 422, a height sensor 423, a posture sensor 424, a microphone (sound detection sensor) 425, a temperature sensor 426, a drive unit 43, a control unit 44, a data storage unit 45, a memory 46, a first communication unit 471, and a second communication unit 472.

It is not necessary that all of the sensors such as the positioning unit 421, the direction sensor 422, the height sensor 423, the posture sensor 424, the microphone 425, and the temperature sensor 426 which are described above are mounted on the moving body 40. The moving body 40 may include at least the camera 41.

The camera 41 is supported to be directed in a predetermined direction from the machine body of the moving body 40, and images a scene ahead of the line of sight in accordance with a direction of the machine body. The camera 41 can continuously acquire captured images at a constant frame rate. Accordingly, it is possible to perform imaging of a plurality of locations including an inspection location. An image signal obtained by imaging is output to an image processing unit 411 connected to the camera 41.

Captured image data having a predetermined format is generated by the image processing unit 411, and is recorded in the memory 46.

The camera 41 is not limited to those which acquire an image of visible light, and an infrared camera for imaging of infrared rays may be used. When the infrared camera is used, distance image data can be obtained by using a phase difference method.

Moreover, the camera 41 is not limited to a monocular camera, and a stereo camera may be used. In this case, it is also possible to obtain the distance image data.

The positioning unit 421 is a global navigation satellite system (GNSS) receiver and measures a current position of the moving body 40. Real time kinematic (RTK), which has higher accuracy than global positioning system (GPS), is applied to the positioning unit 421 of the present embodiment.

The direction sensor 422 is a three-axis gyro azimuth sensor and detects an advancing direction of the moving body 40 and a tilt angle of the machine body.

The height sensor 423 is, for example, an optical type and projects light downward to detect a height of the machine body from a phase difference generated by reflected light thereof.

The posture sensor 424 includes a three-dimensional acceleration sensor and detects acceleration in each direction of an X-axis, a Y-axis, and a Z-axis which are defined in the moving body 40. A posture of the machine body can be detected from gravitational acceleration detected for each of these axes.

The microphone 425 has directivity, and detects sound of an object located ahead in the same direction as that of the line of sight of the camera 41.

The temperature sensor 426 is a so-called radiation thermometer, which is anon-contact type. The temperature sensor 426 detects a temperature of the object located ahead in the same direction as that of the line of sight of the camera 41.

Each of these sensors may be any as long as it can detect desired information, and its sensor type, detection principle, and the like are not limited to those described above.

The first communication unit 471 performs data communication with the base station 120 via the satellite 110.

The second communication unit 472 performs data communication with the base station 150 directly.

The drive unit 43 is configured to output a thrust for a movement operation of the moving body 40, and has a plurality of rotors and a plurality of motors serving as rotation drive sources provided for each rotor. The drive unit 43 is controlled by the control unit 44 so that the machine body moves in a target movement direction.

The data storage unit 45 is a non-volatile storage device that stores various information relating to a control program and control of the moving body 40.

The memory 46 stores captured image data captured by the camera 41 and detection data detected by the microphone 425 and the temperature sensor 426.

The memory 46 may include the non-volatile storage device. In addition, the memory 46 may include a removable recording medium. In this case, the removed recording medium is used to transmit and receive the captured image data and the detection data to the external information terminals 60 and 70 and the management server 50 without passing through the network 130.

The control unit 44 comprehensively controls each part of the moving body 40 based on a control program stored in the data storage unit 45, a control command transmitted from the information terminals 60 and 70, and the like.

For example, the control unit 44 acquires information on the position and a posture of the moving body 40 at the time of imaging and detection from the direction sensor 422 and the posture sensor 424, and records the information in the memory 46 in association with the captured image data and the detection data (hereinafter, the captured image data and the detection data associated with the information on the position and the posture of the moving body 40 at the time of imaging and detection are referred to as "diagnostic information data"). In addition, the control unit 44 transmits the diagnostic information data to the information terminals 60 and 70 and the management server 50 via the first communication unit 471 and the second communication unit 472.

Crane

Subsequently, the crane 20 will be described.

Figure 3:
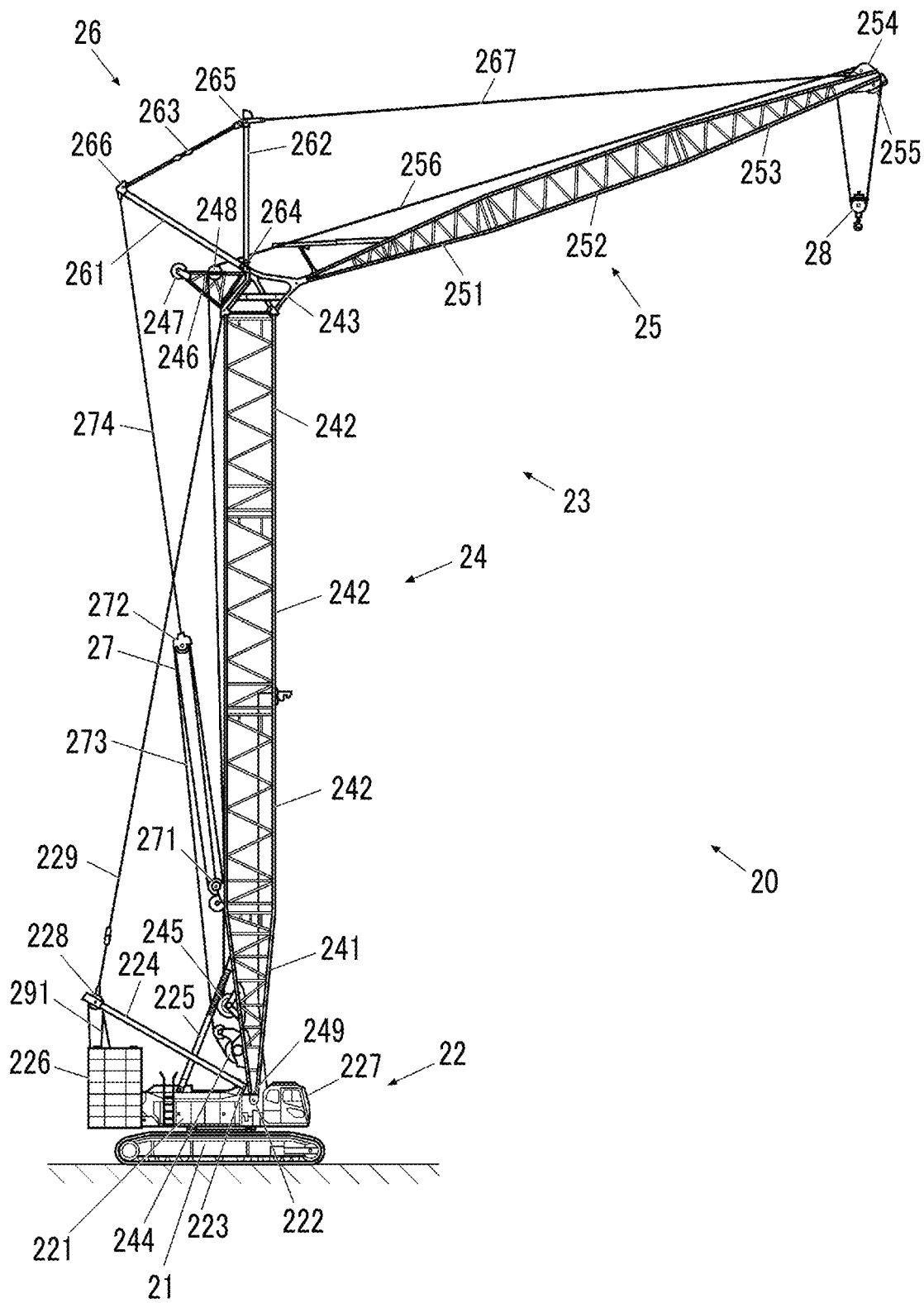
FIG. 3 is a side surface view of a crane.

FIG. 3 is a side surface view of the crane 20.

In the present embodiment, as the crane 20, a so-called mobile tower crane will be described as an example. In describing the crane 20 below, a forward moving direction of the crane 20 (a predetermined forward moving direction of a lower traveling body 21, regardless of a facing direction of a rotating platform 22) will be defined as "front". A rearward moving direction will be defined as "rear". A left-hand side in a state of facing the front will be defined as "left". A right-hand side in a state of facing the front will be defined as "right".

As illustrated in FIG. 3, the crane 20 includes the lower traveling body 21 having a crawler type that can travel by itself, the rotating platform 22 mounted on the lower traveling body 21 to be capable of turning, and a front attachment 23 attached to a front side of the rotating platform 22 to be capable of derricking.

The rotating platform 22 configures a main body of the crane 20, and includes a turning frame 221 extending in forward and rearward directions. A boom attachment portion 222 is provided on a front side of the turning frame 221, and a base end 249 of a tower boom 24 (to be described later) is attached to the boom attachment portion 222 to be capable of derricking.

In addition, in the turning frame 221, a mast attachment portion 223 is provided in the vicinity of a rear side of the boom attachment portion 222. A base end of a mast 224 (to be described later) is attached to the mast attachment portion 223 to be pivotable. Furthermore, in the turning frame 221, a base end of a backstop 225 (to be described later) is attached to a rear side of the mast attachment portion 223 to be pivotable.

A counterweight 226 for balancing a weight between a front attachment 23 and a suspended load is arranged on the rear side of the turning frame 221. In addition, a boom derricking winch (not illustrated) is arranged on the rear side of the turning frame 221. On the other hand, a cab 227 in which a driver's seat and various manipulation devices (both not illustrated) are disposed is provided on a front right side of the turning frame 221.

The front attachment 23 is provided in the rotating platform 22, and transports loads such as materials between a ground and a high place. The front attachment 23 includes the tower boom 24, a tower jib 25, and a tower strut 26.

The tower boom 24 is attached to the rotating platform 22 to be capable of derricking. The tower boom 24 includes a lower boom 241 whose base end (foot portion) 249 is attached to the boom attachment portion 222 of the turning frame 221 to be capable of derricking, a plurality of (for example, three levels) intermediate booms 242 whose base end is attached to a tip of the lower boom 241, and an upper boom 243 attached to a tip of the intermediate boom 242 located on a most tip side. A jib derricking winch 244 and a main winding winch 245 (to be described later) are attached to the lower boom 241.

As illustrated in the drawing, each pillar member of the intermediate booms 242 adjacent to each other in a length direction is connected by using a connecting pin. In addition, the intermediate boom 242 located on a lowermost side and the lower boom 241, and the intermediate boom 242 located on an uppermost side and the upper boom 243 are respectively connected to each other by using the connecting pins.

The upper boom 243 has a shape whose upper portion protrudes forward when the tower boom 24 is in a standing posture (posture illustrated in FIG. 3). A lower side portion of the upper boom 243 is attached to a tip (upper end) of the intermediate boom 242 located on the uppermost side. The tower jib 25 (to be described later) is attached to a front end side of the upper boom 243 to be capable of derricking, and the tower strut 26 (to be described later) is attached to an upper end side of the upper boom 243 to be capable of oscillating. In addition, a triangular sheave bracket 246 projects rearward in the upper boom 243. A tower guide sheave 247 and a guide sheave 248 are attached to the sheave bracket 246 to be rotatable.

The tower jib 25 is attached to a tip of the upper boom 243 of the tower boom 24 to be capable of derricking. The tower jib 25 includes a lower jib 251 whose base end is attached to the upper boom 243 to be capable of derricking, an intermediate jib 252 attached to a tip of the lower jib 251, and an upper jib 253 provided in a tip of the intermediate jib 252. A guide sheave 254 and a point sheave 255 are attached to a tip side of the upper jib 253 to be rotatable. A main winding rope 256 (to be described later) is wound around the guide sheave 254 and the point sheave 255.

The tower strut 26 is attached to the upper end side of the upper boom 243 of the tower boom 24 to be capable of oscillating. The tower strut 26 connects a first strut 261, a second strut 262, and a third strut 263 by using a first connecting portion 264, a second connecting portion 265, and a third connecting portion 266. In this manner, the tower strut 26 is configured as a triangular structure.

Here, the first connecting portion 264 of the tower strut 26 is attached to the upper end side of the upper boom 243. In this manner, the tower strut 26 is attached to an upper end of the tower boom 24 to be capable of oscillating while the first connecting portion 264 serves as a fulcrum. In addition, one end of a pendant rope 267 is connected to the second connecting portion 265, and the other end of the pendant rope 267 is connected to the tip side of the upper jib 253 of the tower jib 25. Furthermore, a boom-side pendant rope 274 (to be described later) is connected to the third connecting portion 266.

The jib derricking winch 244 is attached to the lower boom 241 of the tower boom 24. The jib derricking winch 244 causes the tower jib 25 to perform derricking via the tower strut 26. The jib derricking winch 244 and the third connecting portion 266 of the tower strut 26 are connected to each other by a jib derricking rope 27.

The jib derricking rope 27 is provided between the jib derricking winch 244 and the tower strut 26. The jib derricking rope 27 includes a lower spreader 271 having a plurality of sheaves attached to the intermediate boom 242 of the tower boom 24, an upper spreader 272 having a plurality of sheaves provided to face the lower spreader 271, a winding rope 273 wound around the jib derricking winch 244 in a state of being sequentially wound around the sheave of the lower spreader 271 and the sheave of the upper spreader 272, and a boom-side pendant rope 274 in which one end is connected to the upper spreader 272 and the other end is connected to the third connecting portion 266 of the tower strut 26.

Therefore, the winding rope 273 is wound and unwound by the jib derricking winch 244. In this manner, the upper spreader 272 moves close to and away from the lower spreader 271, and the tower strut 26 oscillates while the first connecting portion 264 serves as a fulcrum. The oscillation of the tower strut 26 is transmitted to the tower jib 25 via the pendant rope 267. In this manner, the tower jib 25 is configured to perform derricking on the tip side of the tower boom 24.

The main winding winch 245 is located in the vicinity of an upper side of the jib derricking winch 244, and is attached to the lower boom 241 of the tower boom 24. One end of the main winding rope 256 is wound around the main winding winch 245. The other end of the main winding rope 256 is attached to a suspended load hook 28 via the guide sheave 248 of the sheave bracket 246, the guide sheave 254 of the tower jib 25, and the point sheave 255. Therefore, the main winding rope 256 is wound and unwound by the main winding winch 245 so that the suspended load hook 28 can be raised and lowered.

The backstop 225 is provided between the turning frame 221 and the lower boom 241 of the tower boom 24. The backstop 225 supports the standing tower boom 24 from behind.

A base end of the mast 224 is attached to the mast attachment portion 223 of the turning frame 221 to be pivotable. The tip of the mast 224 is a free end that is pivotable in upward, downward, forward, and rearward directions.

A boom spreader 228 is provided in the tip of the mast 224, and the boom spreader 228 and the upper boom 243 of the tower boom 24 are connected to each other via a pendant rope 229 having a certain length. In addition, a boom derricking rope 291 sequentially wound over the boom spreader 228 and a spreader (not illustrated) on the turning frame 221 side is wound around a tower boom derricking winch (not illustrated) provided in the turning frame 221.

Therefore, when the boom derricking rope 291 is wound or unwound by tower boom derricking winch, the tower boom 24 can perform derricking (standing or lowering) via the pendant rope 229.

Figure 4:
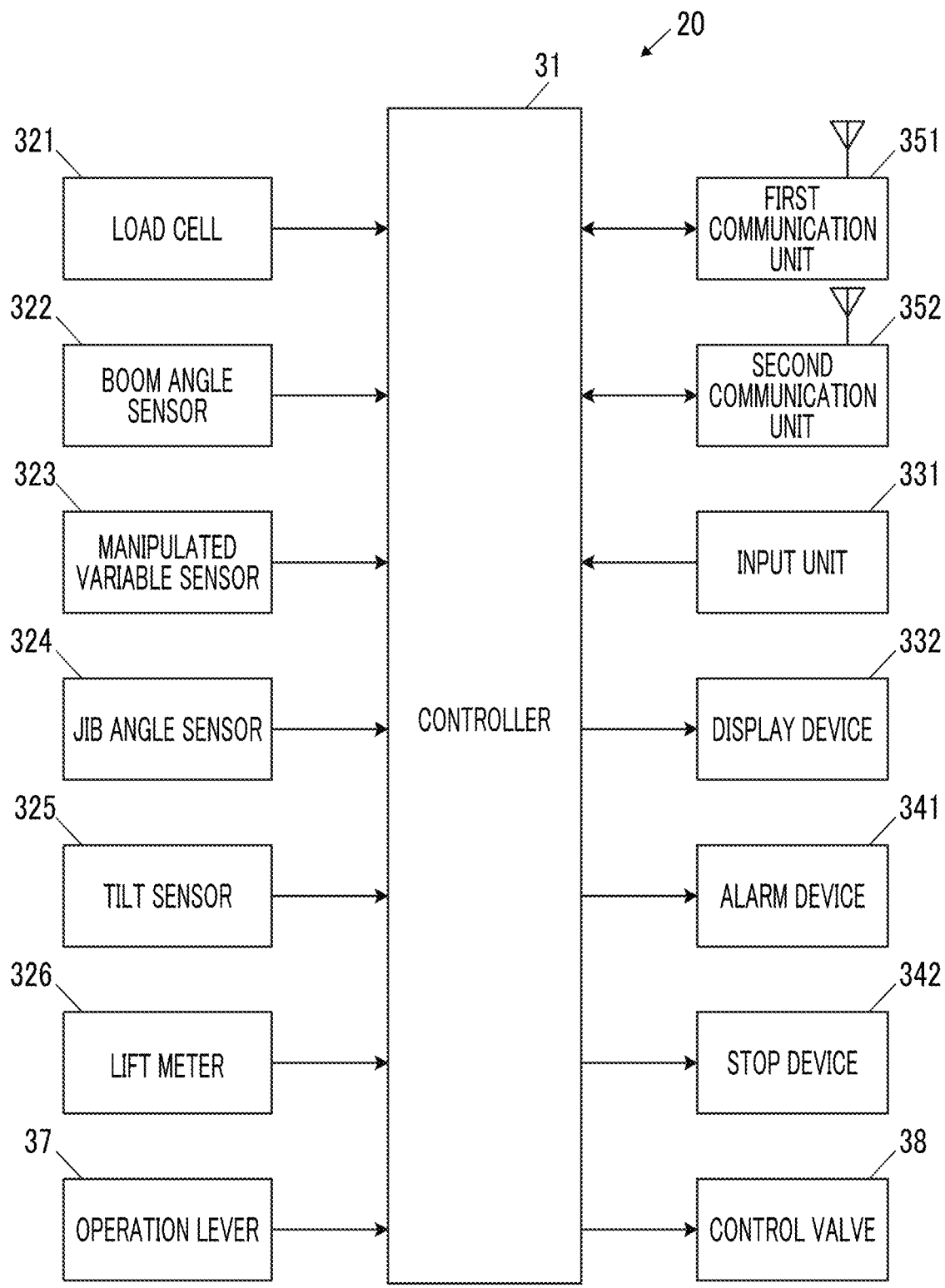
FIG. 4 is a block diagram illustrating a control system of the crane.

FIG. 4 is a block diagram illustrating a control system of the crane 20.

As illustrated in this drawing, the crane 20 includes the controller 31 that comprehensively controls each part of the crane 20. More specifically, the controller 31 executes control of various operations such as traveling, turning, and the suspension load of the crane 20, and processing of abnormality detection. The controller 31 includes a CPU, a ROM and RAM which are storage devices, and a calculation processing device including other peripheral circuits.

In addition, the crane 20 includes a load cell 321, a boom angle sensor 322, a manipulated variable sensor 323, a jib angle sensor 324, a tilt sensor 325, a lift meter 326, and the like as a sensor for acquiring information on a state of each part of the crane 20.

The load cell 321 is attached to the boom spreader 228, detects tension acting on the boom derricking rope 291 that causes the tower boom 24 to perform derricking, and outputs a control signal corresponding to the detected tension to the controller 31.

The boom angle sensor 322 is attached to a base end side of the tower boom 24, detects a derricking angle (hereinafter, also referred to as a boom angle) of the tower boom 24, and outputs a control signal corresponding to the detected boom angle to the controller 31. For example, as the boom angle, the boom angle sensor 322 detects a ground angle which is an angle with respect to a horizontal plane.

The jib angle sensor 324 is attached to a base end side of the tower jib 25, detects a derricking angle (hereinafter, also referred to as a jib angle) of the tower jib 25, and outputs a control signal corresponding to the detected jib angle to the controller 31. For example, as the jib angle, the jib angle sensor 324 detects the ground angle which is the angle with respect to the horizontal plane.

For example, the manipulated variable sensor 323 detects a manipulated variable of a hydraulic pilot type operation lever, and outputs a control signal corresponding to the detected manipulated variable to the controller 31.

The tilt sensor 325 detects a tilt of the crane 20, that is a tilt of a ground on which the crane 20 is located, and outputs the tilt to the controller 31.

The lift meter 326 detects a height position of the suspended load hook 28 and outputs the height position to the controller 31.

In addition, the crane 20 includes an input unit 331, a display device 332, an alarm device 341, a stop device 342, a first communication unit 351, a second communication unit 352, an operation lever 37, and a control valve 38.

The input unit 331 is, for example, a touch panel, and outputs a control signal corresponding to an operation from a worker to the controller 31. The worker can operate the input unit 331 to set the number of application times of the main winding rope 256, a length of the tower boom, and a mass of the suspended load hook 28.

For example, the display device 332 includes a touch panel type display that is also used as the input unit 331, and displays information on the suspended load or information on a work posture on a display screen, based on the control signal output from the controller 31.

The alarm device 341 issues an alarm, based on a control signal output from the controller 31.

The stop device 342 stops driving a hydraulic motor (not illustrated) connected to each of the main winding winch 245 and the jib derricking winch 244, based on a control signal output from the controller 31. For example, the stop device 342 is an electromagnetic switching valve which can cut off pressure oil supply from a hydraulic pump to a hydraulic motor.

The first communication unit 351 performs data communication with the base station 120 via the satellite 110.

The second communication unit 352 performs data communication with the base station 150 directly.

The control valve 38 includes a plurality of valves that can be switched in accordance with a control signal from the controller 31.

For example, the control valve 38 includes a valve for hydraulic pressure supply, interruption, and rotation direction switching from the hydraulic pump included in the crane body 20 to the hydraulic motor that rotationally drives drive wheels of the lower traveling body 21, a valve for hydraulic pressure supply, interruption, and rotation direction switching from the hydraulic pump to the hydraulic motor that performs a turning operation of the rotating platform 22, a valve for hydraulic pressure supply, interruption, and rotation direction switching from the hydraulic pump to the hydraulic motor that rotationally drives the tower boom derricking winch, a valve for hydraulic pressure supply, interruption, and rotation direction switching from the hydraulic pump to the hydraulic motor that rotationally drives the jib derricking winch 244, and a valve for hydraulic pressure supply, interruption, and rotation direction switching from the hydraulic pump to the hydraulic motor that rotationally drives the main winding winch 245.

The operation lever 37 includes a plurality of levers for inputting control signals for individually performing switching to various valves of the control valve 38 through the controller 31.

For example, a traveling lever which is one of the operation levers 37 inputs a switching signal to a valve that performs hydraulic pressure supply, interruption, and rotation direction switching for the hydraulic motor that rotationally drives the drive wheels of the above-described lower traveling body 21.

In addition, a turning lever which is one of the operation levers 37 inputs a switching signal to a valve that performs hydraulic pressure supply, interruption, and rotation direction switching from the above-described hydraulic pump to the hydraulic motor that performs a turning operation of the rotating platform 22.

In addition, a boom derricking lever which is one of the operation levers 37 inputs a switching signal to a valve that performs hydraulic pressure supply, interruption, and rotation direction switching from the above-described hydraulic pump to the hydraulic motor that rotationally drives the tower boom derricking winch.

In addition, a jib derricking lever which is one of the operation levers 37 inputs a switching signal to a valve that performs hydraulic pressure supply, interruption, and rotation direction switching from the above-described hydraulic pump to the hydraulic motor that rotationally drives the jib derricking winch 244.

In addition, a winding lever which is one of the operation levers 37 inputs a switching signal to a valve that performs hydraulic pressure supply, interruption, and rotation direction switching from the above-described hydraulic pump to the hydraulic motor that rotationally drives the main winding winch 245.

The controller 31 inputs control signals corresponding to hydraulic pressure supply, interruption, and rotation direction switching to each valve configuring the corresponding control valve 38 in accordance with an operation of various levers configuring the operation lever 37, and performs control on each hydraulic motor.

In this manner, a worker can operate the operation lever 37 to perform a traveling operation of the crane body 20, a turning operation of the rotating platform 22, a derricking operation of the tower boom 24, a derricking operation of the tower jib 25, and raising/lowering operations of the suspended load hook 28.

Management Server

Figure 5:
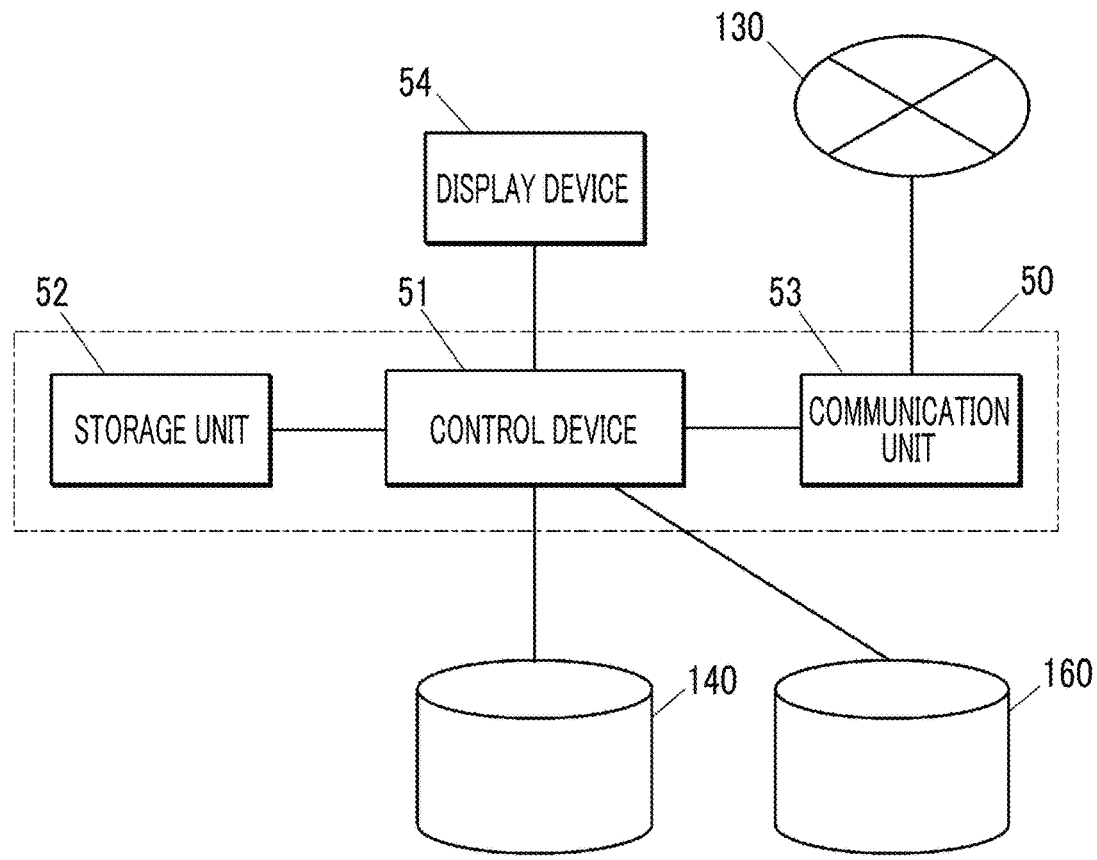
FIG. 5 is a block diagram illustrating a configuration of a management server.

FIG. 5 is a block diagram illustrating a configuration of the management server 50.

As illustrated in this drawing, the management server 50 includes a control device 51, a storage unit 52, and a communication unit 53.

The control device 51 includes a CPU and a calculation processing device having peripheral circuits. The control device 51 controls each unit of the management server 50 by reading and executing a control program stored in advance in the storage unit 52.

For example, the storage unit 52 is a non-volatile storage device.

The communication unit 53 performs data communication (transmission and reception) via the network 130 in accordance with a predetermined procedure.

A display device 54 is connected to the control device 51, and the control device 51 displays the information stored in the storage unit 52, the inspection information database 140, and the customer information database 160 on the display screen of the display device 54.

The inspection information database 140 and the customer information database 160 are connected to the control device 51.

The inspection information database 140 stores date and time information, a work machine ID of the crane 20, and a diagnosis result which are received from the control device 51 via the base stations 120 and 150 (including a case via the crane 20) from the moving body 40 in association with each other.

The customer information database 160 stores the work machine ID of the crane 20, customer information relating to a customer who owns the crane 20, and a delivery destination address of the customer in association with each other. The delivery destination address of the customer which corresponds to one work machine ID can be set in any desired way.

Accordingly, the control device 51 specifies the customer and the delivery destination of the customer, when the information in the crane inspection information database 140 is updated for the specific crane 20, and transmits the updated information of the crane 20, or notifies the worker of the updated information. In addition, when there is an access from the customer side, the control device 51 may allow transmitting or reading various information recorded in the inspection information database 140 of the crane relating to the crane 20 of the customer. In this case, a password may be set for each customer in the customer information database 160, and the password may be requested when there is an access from the customer side. It is preferable that the password is registered in the customer information database 160.

Based on the diagnostic information data including the captured image data and the detection data which are acquired from the moving body 40, the control device 51 performs diagnostic processing for determining whether or not there is an abnormality at the inspection locations of the crane 20 with regard to inspection items described below.

The inspection items are as follows, for example.

(1) Crack, deformation, damage, and corrosion in the tower boom and the tower jib
(2) Abrasion and damage in the foot pin, the joint pin, and the bush
(3) Abrasion, damage, irregular winding, a terminal state, and corrosion in the wire rope
(4) Damage and corrosion in the pendant rope
(5) Crack, deformation, damage, and corrosion in each spreader, hanger, and tower strut
(6) Crack, deformation, abrasion, and corrosion in the suspended load hook
(7) Operation state, deformation, and damage in a wire detachment stopper of the suspended load hook
(8) Loosening of a nut of the suspended load hook, and damage and corrosion in a screw portion
(9) Abrasion, deformation, damage, and corrosion in each sheave
(10) Operation state of an excessive winding prevention device for the suspended load hook, the tower boom, and the tower jib

(11) Operation state of the load cell and the boom angle sensor
(12) Deformation, damage, and corrosion in the backstop
(13) Whether or not the attachment is attached to the regular position, and the attached state (bolt tightening omission, falling off, and the like)

Information Terminal

Figure 6:
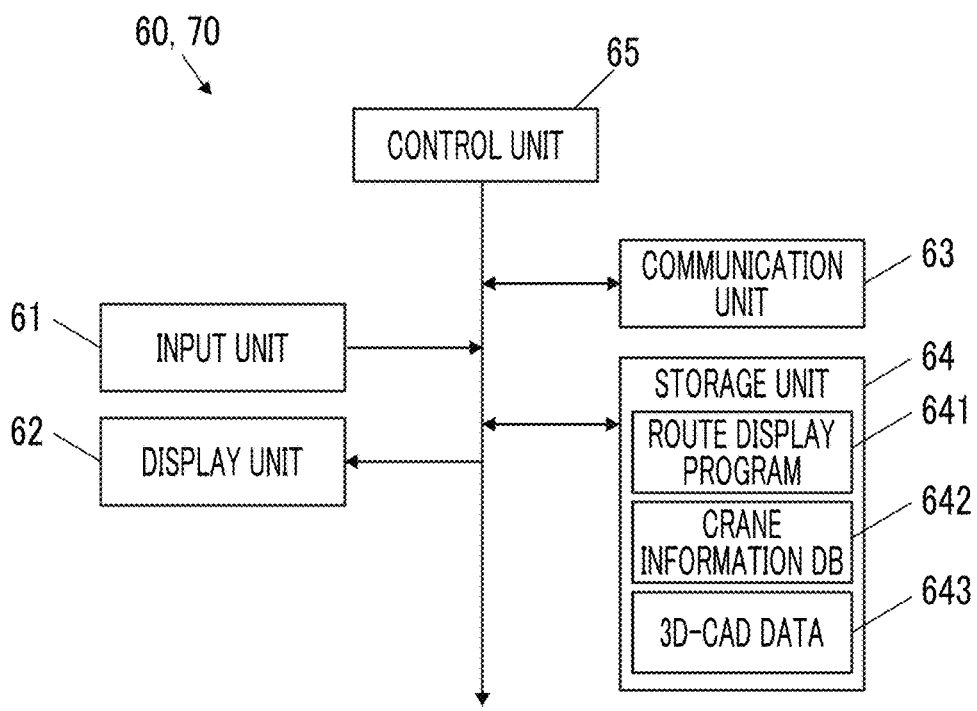
FIG. 6 is a block diagram illustrating a schematic control system of an information terminal.

FIG. 6 is a block diagram illustrating a schematic control system of the information terminals 60 and 70. Since the information terminals 60 and 70 of the present embodiment are configured in substantially the same manner, the information terminal 60 will be described below, and the description of the information terminal 70 will be omitted.

The information terminal 60 is, for example, a terminal device such as a personal computer, a smartphone, or a tablet terminal, and includes an input unit 61, a display unit 62, a communication unit 63, a storage unit 64, and a control unit 65, as illustrated in FIG. 6. The information terminal 60 corresponds to an example of the display device according to the present invention.

The input unit 61 includes, for example, a touch panel, and outputs an input signal corresponding to the operation content of the user to the touch panel to the control unit 65.

The display unit 62 includes, for example, a touch panel type display 620 (refer to FIGS. 8A and 8B), and displays various information on the display 620 based on a display signal input from the control unit 65.

The communication unit 63 can perform data communication (transmission and reception) with the crane 20, the moving body 40, the management server 50, and the like via the network 130. The communication unit 63 may be configured to directly communicate with the crane 20, the moving body 40, and the management server 50.

The storage unit 64 is a memory including a random access memory (RAM), a read only memory (ROM), and the like, stores various programs and data, and also functions as a work area of the control unit 65.

In the present embodiment, the storage unit 64 stores in advance a route display program 641 for executing route display processing (refer to FIG. 7) to be described later.

In addition, the storage unit 64 has a crane information database (DB) 642 in which various information about the crane is stored. In the crane information DB 642, a plurality of pieces of model information (model name) and information on a structure of each model (including a shape and main dimension of each part) are stored in association with each other. Information on the structure of the crane includes, for example, types such as a derricking type (A frame, live mast, or both), a tower jib derricking type (swing lever, luffer), and front specification (crane only, tower only, or both).

In addition, the storage unit 64 stores a three-dimensional CAD (3D-CAD) data 643 of the crane 20.

The crane information DB 642 and the three-dimensional CAD data 643 may be stored in another device (for example, a management server 50) to which the information terminal 60 can communicate (can read information).

The control unit 65 comprehensively controls the information terminal 60 based on a user operation and the like. Specifically, the control unit 65 reads various programs from the storage unit 64 in accordance with an operation signal input from the input unit 61, executes predetermined processing according to the program, temporarily stores a processing result in the storage unit 64, and appropriately outputs the result to the display unit 62.

Flight Route Display of Moving Body

Subsequently, route display processing for setting and displaying a flight route (movement route) of the moving body 40 at the time of inspection of the crane 20 will be described.

Figure 7:
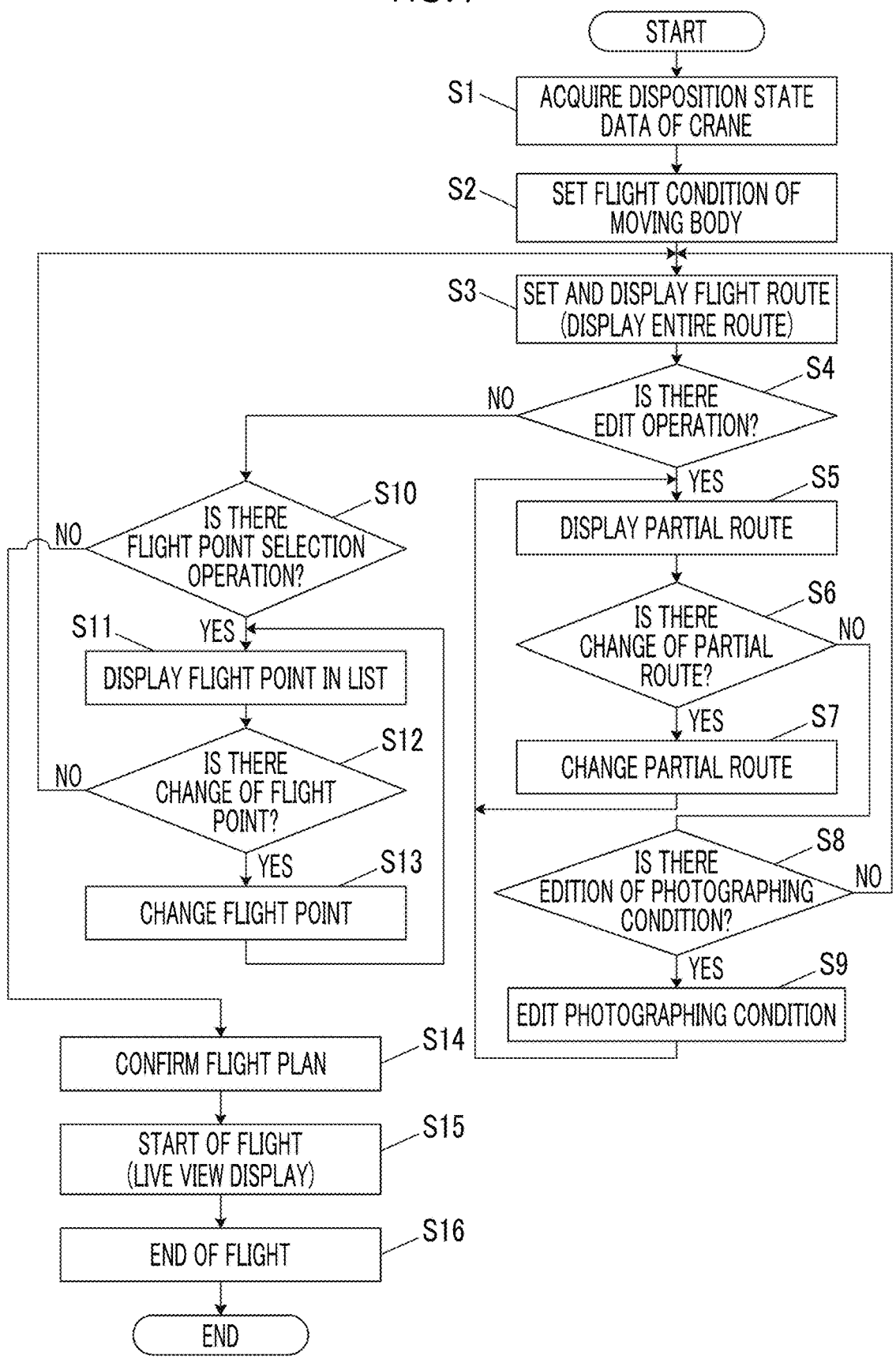
FIG. 7 is a flowchart illustrating a flow of route display processing.

FIG. 7 is a flowchart illustrating a flow of the route display processing. FIGS. 8A to 14B are diagrams illustrating a display example of the display 620 in the route display processing.

Here, a case in which the user operates the information terminal 60 to execute the route display processing, and sets and displays the flight route of the moving body 40 will be described. The route display processing is executed by reading and developing the route display program 641 from the storage unit 64 by the control unit 65 of the information terminal 60.

Here, it is assumed that the crane 20 is stationary in an assembled state. In the following description, although the moving body 40 flies along the flight route after the flight route is set in the route display processing, the flight of the moving body 40 does not have to be included in the route display processing.

As illustrated in FIG. 7, when the route display processing is executed, first, the control unit 65 acquires data of a disposition state of the crane 20 (hereinafter, referred to as a "disposition state data") (step S1).

Here, the "disposition state" of the crane 20 means a state relating to the structure (including size and shape), the posture, the position and the direction of the crane 20.

Specifically, in the step S1, the control unit 65 first sets the model of the crane 20 based on the user operation. When the user selects the model of the crane 20 via the input unit 61, the control unit 65 reads out the information on the structure (including size and shape) of the model from the crane information DB 642 and sets it. In addition, in a case where there is a dimension (for example, a length of the boom) that cannot be specified only by selection of the model, the control unit 65 sets the dimension based on the user operation.

In step S1, the control unit 65 acquires information on the posture of the crane 20 from the crane 20 itself via the communication unit 63. Specifically, the control unit 65 acquires, as information on the posture of the crane 20, a boom angle, a jib angle, a tilt of the crane 20, and a height of the suspended load hook 28 which are measured by the boom angle sensor 322, the jib angle sensor 324, a tilt sensor 325, and a lift meter 326 of the crane 20. The measured boom angle, jib angle, tilt of the crane 20, and height of the suspended load hook 28 are displayed on the display device 332 of the crane 20, and the user may input the measured value to the information terminal 60 while viewing the display.

In addition, in step S1, the control unit 65 acquires information on the position and the direction of the crane 20 by the positioning unit 421 and the direction sensor 422 of the moving body 40. Specifically, information on the position and the direction of the crane 20 is acquired by stopping the moving body 40 at a predetermined position (for example, on a crawler) of the crane 20, and measuring the position and the direction by the positioning unit 421 and the direction sensor 422. A positioning unit and a direction sensor are provided in the crane 20, and the position and the direction of the crane 20 may be measured by the positioning unit and the direction sensor. In addition, the position and the direction of the crane 20 may be acquired by direct input (numerical input) of the user.

In this way, the disposition state data regarding the structure, posture, position, and direction of the crane 20 is acquired, and the disposition state of the crane 20 is specified by the disposition state data.

Next, the control unit 65 sets a flight condition (flight information) of the moving body 40 (step S2).

In the present embodiment, a lower limit of a distance between the moving body 40 and the crane 20 during flight (flight prohibition distance) is set as the flight condition of the moving body 40. The "distance" in this case is not particularly limited, but it means a distance in a horizontal plane.

Next, the control unit 65 sets a flight route R of the moving body 40 based on the disposition state data of the crane 20 acquired in step S1 and the flight condition set in step S2, and displays the flight route R on the display 620 (step S3).

Figure 8A:
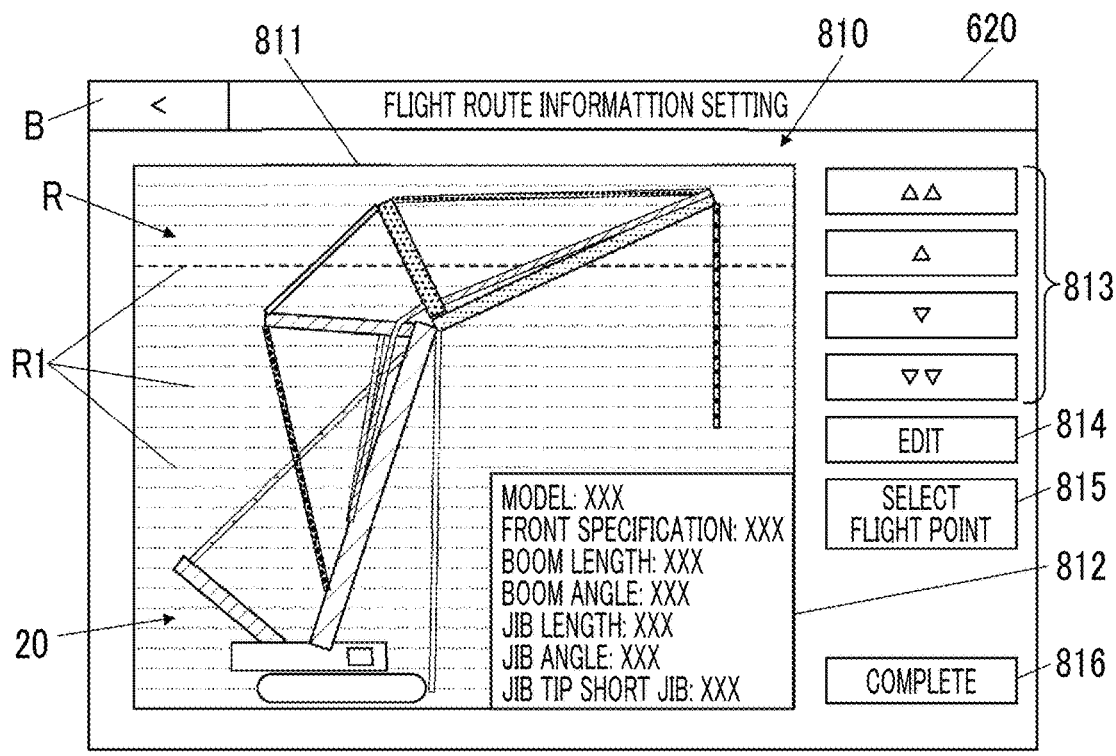
FIGS. 8A and 8B are diagrams illustrating a display example of a display in the route display processing.
Figure 13A:
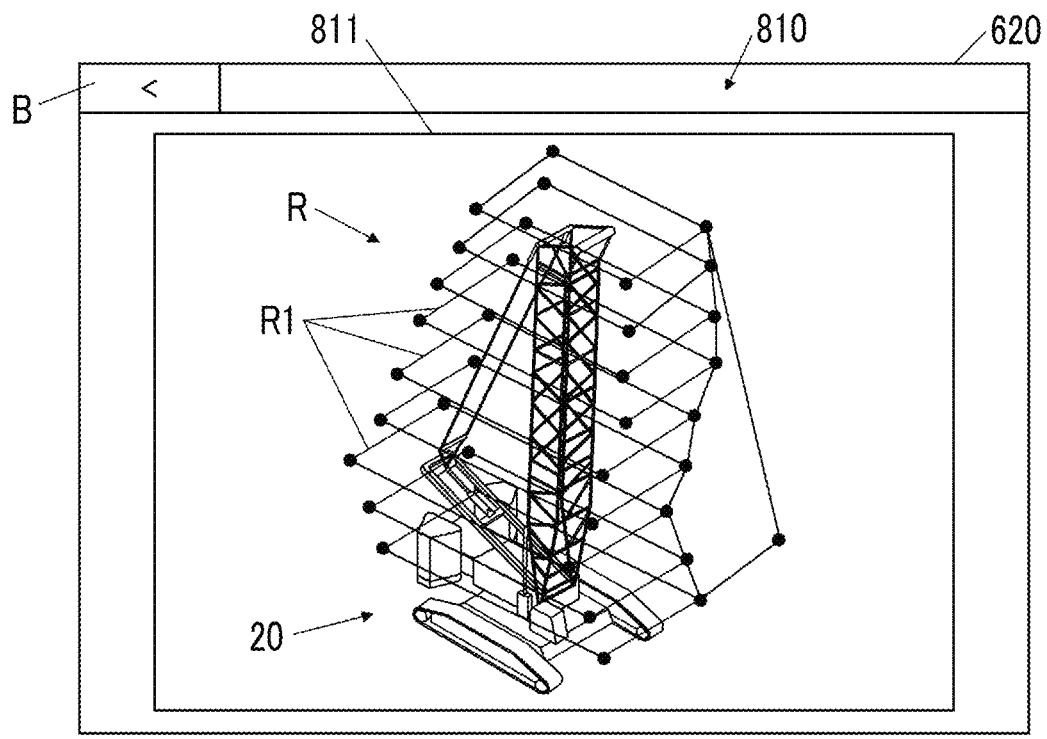
FIGS. 13A and 13B are diagrams illustrating a display example of the display in the route display processing.

In this step, as illustrated in FIG. 8A, an entire route display screen 810 displaying an entire flight route R over an entire height of the crane 20 is displayed on the display 620. The flight route R is configured such that a partial route R1 that moves around (one round) the crane 20 in a horizontal plane is set in a plurality of layers at a predetermined vertical distance over the entire height of the crane 20 (FIG. 13A).

Here, only a height position of each partial route R1 among the flight route R is indicated on the entire route display screen 810 in the present embodiment. The vertical distance between the partial routes R1 may be a predetermined default value or may be set in step S2.

In the entire route display screen 810 of the present embodiment, the entire crane 20 (side view appearance) is schematically displayed in two dimensions on a main window 811 of the display 620, and a plurality of partial routes R1 (height positions of the partial routes) constituting the flight route Rare displayed on the crane image. In the crane image, the main parts of the crane 20 are displayed in a distinguishable manner. The partial route R1 can be selected for editing and the like, and the selected partial route R1 is actively displayed (displayed by a large broken line in the drawing). In addition, the main information of the crane 20 (for example, model, front specification, boom length, boom angle, and the like) is displayed on a sub-window 812 at a right corner of the main window 811.

On a right side of the main window 811, a movement button 813 for moving the height of the selected partial route R1, an edit button 814 for editing the partial route R1, a flight point selection button 815 for selecting a flight point to be described later, and a complete button 816 for finishing the operation on the entire route display screen 810 are displayed.

Next, the control unit 65 determines whether or not an operation of editing the partial route R1 is performed (step S4). Here, the "editing" of the partial route R1 includes various operations relating to the partial route R1 including a "change" of the route to be described later.

Here, when the edit button 814 is operated in a state where the partial route R1 of any height is selected by the user, the control unit 65 determines that the operation of editing the partial route R1 has been performed (step S4; Yes), and the partial route R1 of the selected height (layer) is displayed in detail on the display 620 (step S5). The control unit 65 switches the display content of the display 620 from the entire route display screen 810 to the partial route display screen 820 in which the selected partial route R1 is displayed in detail.

Figure 8B:
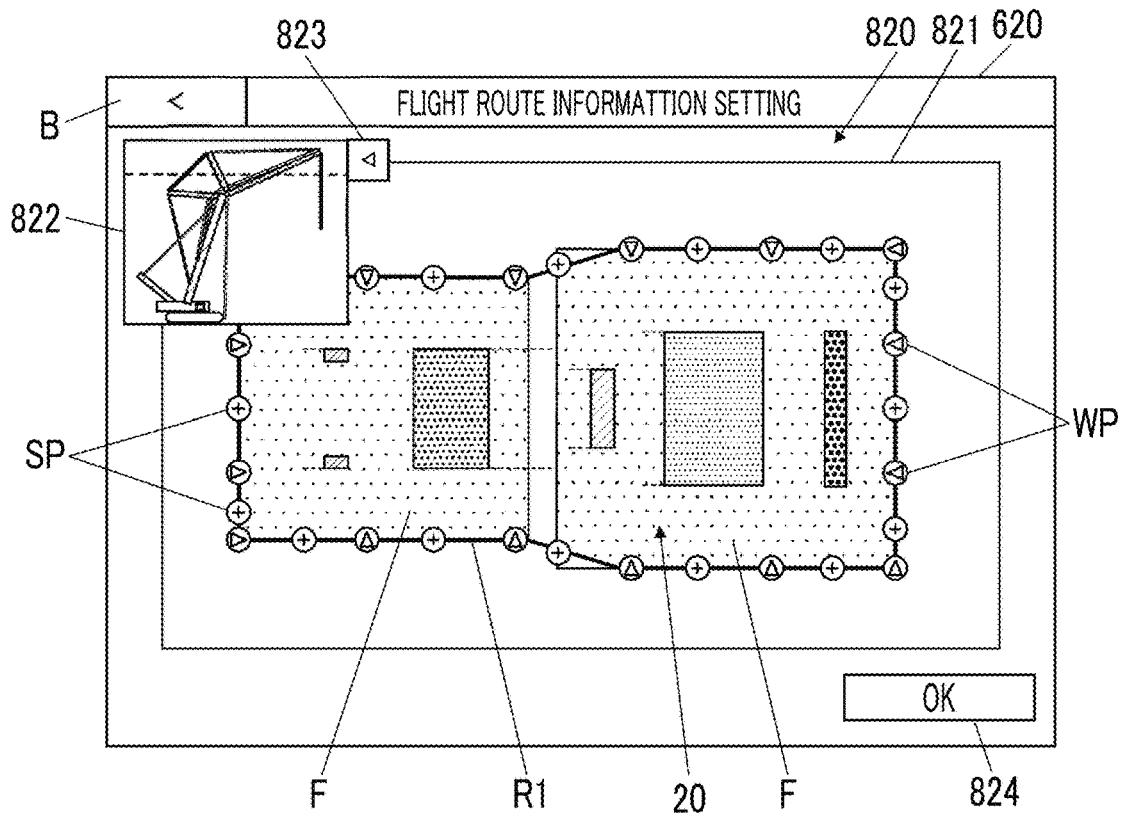

In the partial route display screen 820 of the present embodiment, as illustrated in FIG. 8B, a cross section of the crane 20 having a selected height and a partial route R1 moving the surroundings of the crane 20 are displayed in a plane on the main window 821 of the display 620. In the main window 821, each part of the crane 20 is distinguishably displayed in the same manner as the entire route display screen 810. A range of the flight prohibition distance set in step S2 is distinguishably displayed as a flight prohibition area F the surroundings of the crane 20.

The partial route R1 is set (automatically generated) to move the surroundings of the crane 20 in the horizontal plane at the flight prohibition distance. More specifically, a plurality of waypoints WP are set to move the surroundings of the crane 20 outside the flight prohibition area F, and a partial route R1 is set to pass through the plurality of waypoints WP. The waypoints WP are also a plurality of photographing points at which the camera 41 performs photographing. In addition, on the partial route R1, a photographing point addition button SP for adding a waypoint WP (photographing point) is displayed between two adjacent waypoints WP.

In addition, the appearance of the crane and the height position of the partial route R1 displayed on the main window 821 are displayed on the sub-window 822 at the left corner of the display 620. The sub-window 822 can be switched between display and non-display by operating a toggle button 823 displayed at the corner thereof (refer to FIGS. 10A and 10B, and the like).

Figure 9A:
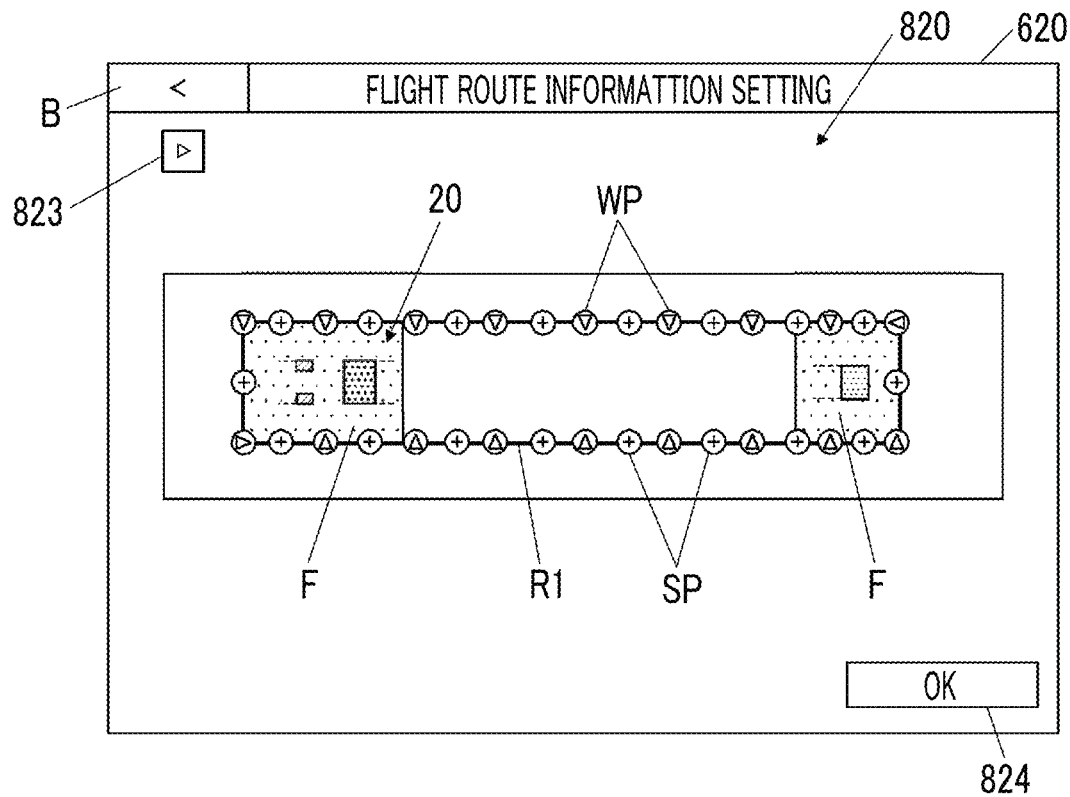
FIGS. 9A and 9B are diagrams illustrating a display example of the display in the route display processing.
Figure 9B:
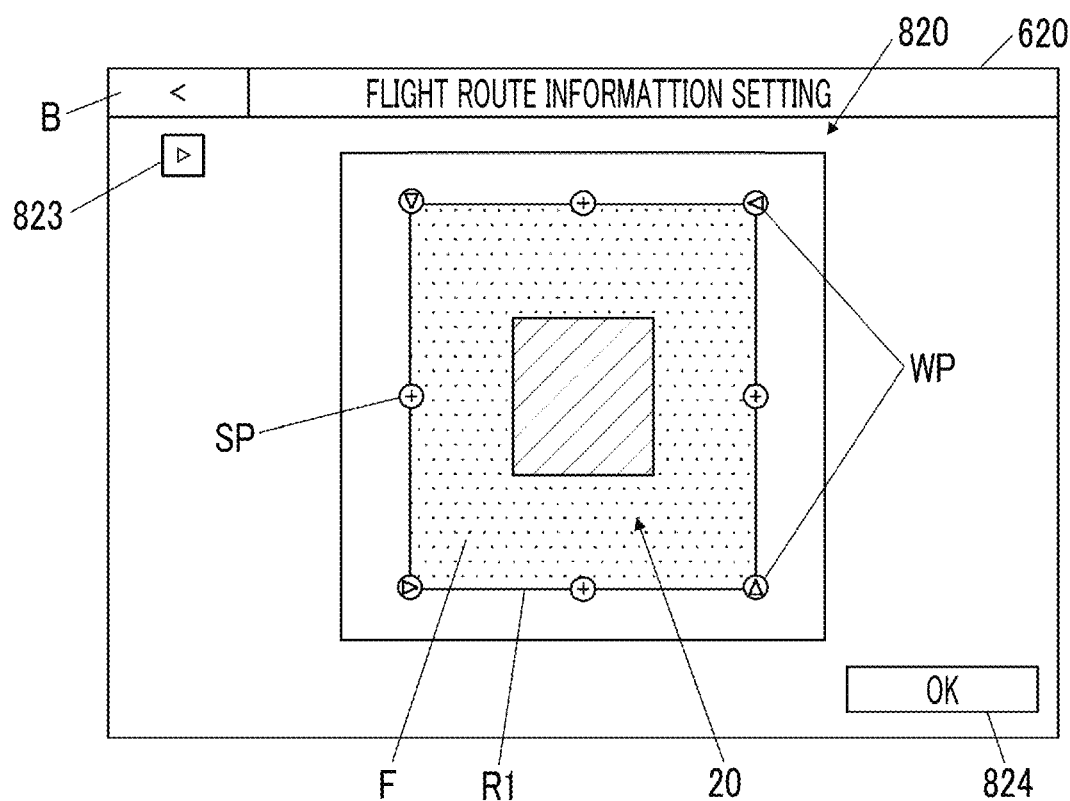

In the main window 821, as illustrated in FIG. 9A, an end-to-end+predetermined value of the crane cross section is set to a lateral size of the screen and a longitudinal size is changed so that even a long crane cross section in the front-rear direction (left-right direction in the drawing) fits on the screen. As illustrated in FIG. 9B, in a case of a crane cross section having a larger lateral width (width in the vertical direction in the drawing), a lateral width+predetermined value is set to the longitudinal size of the screen, and the lateral size is changed.

Next, the control unit 65 determines whether or not an operation of changing the partial route R1 is performed (step S6).

In a case where it is determined that the operation of changing the partial route R1 has been performed (step S6; Yes), the control unit 65 changes the partial route R1 according to the operation (step S7). After that, the control unit 65 shifts the process to the above-described step S5 and displays the changed partial route R1.

In the present embodiment, the partial route R1 is changed by, for example, the following user operation.

Figure 10A:
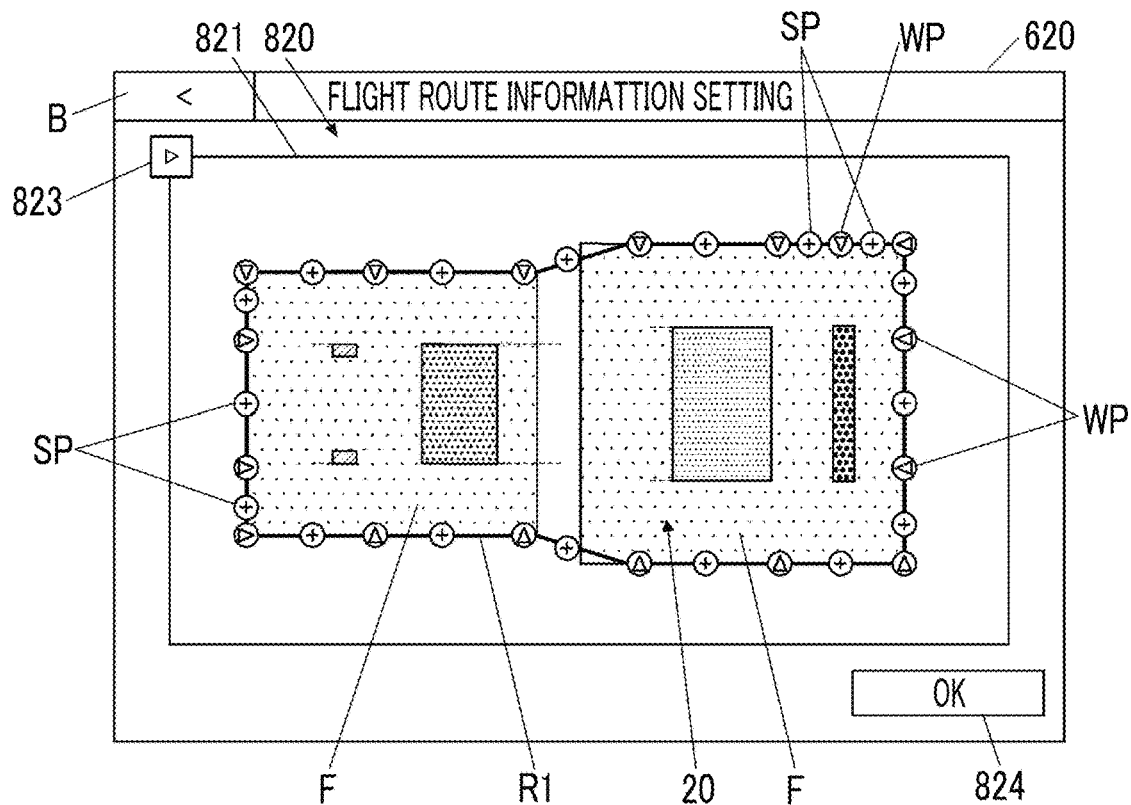
FIGS. 10A and 10B are diagrams illustrating a display example of the display in the route display processing.

First, when the user operates the photographing point addition button SP, as illustrated in FIG. 10A, the waypoint WP is disposed at the position of the operated photographing point addition button SP, and the photographing point addition buttons SP are additionally disposed on both sides thereof.

Figure 10B:
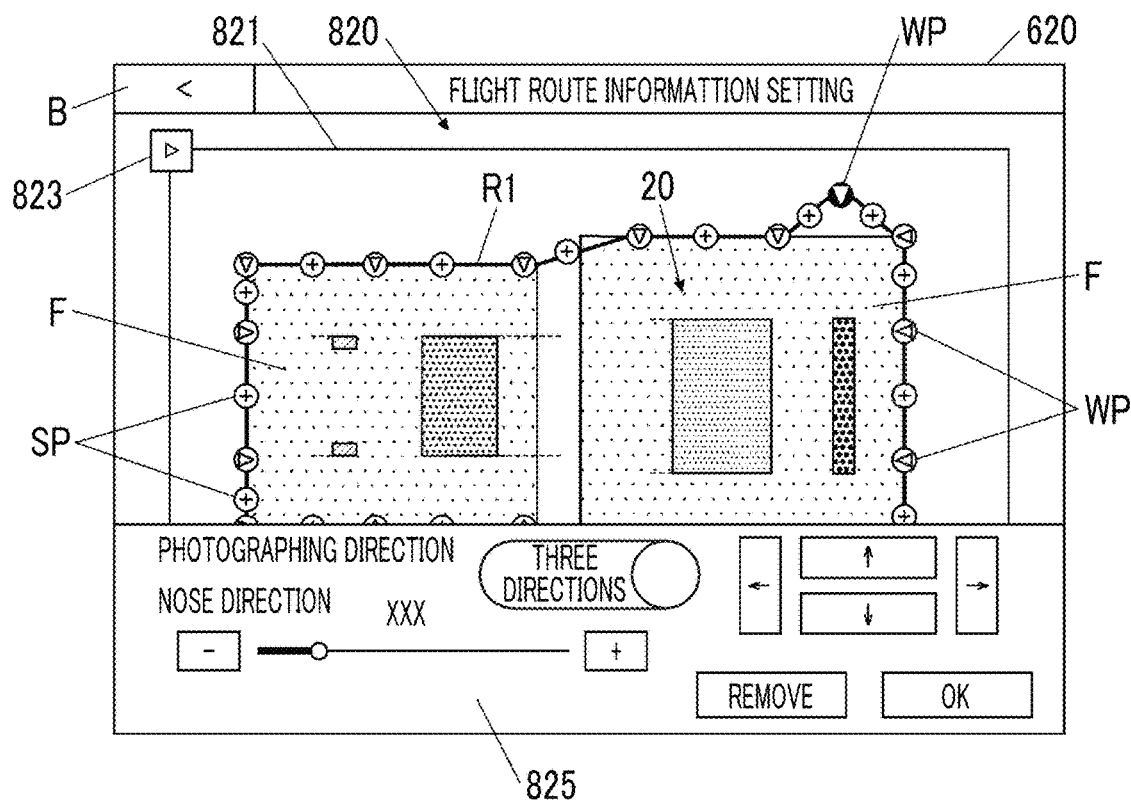

In addition, when the user presses the waypoint WP for a long time, for example, the waypoint WP is inversely displayed and becomes a movable active state as illustrated in FIG. 10B. When the user moves the waypoint WP and then releases it, the waypoint WP returns to an inactive state and is fixed, and the inverted display also returns to an original state. The waypoint WP cannot be disposed (moved) in the flight prohibition area F. In addition, when the waypoint WP is in the active state, a photographing point editing window 825 is pop-up displayed. The photographing point editing window 825 will be described later.

The user can appropriately change the partial route R1 by such an operation.

In a case where it is determined in step S6 that the operation of changing the partial route R1 is not performed (step S6; No), the control unit 65 determines whether or not the operation of editing the photographing conditions is performed (step S8).

In a case where it is determined that the operation of editing the photographing conditions has been performed (step S8; Yes), the control unit 65 edits the photographing conditions according to the operation (step S9). After that, the control unit 65 shifts the process to step S5 described above.

Figure 11A:
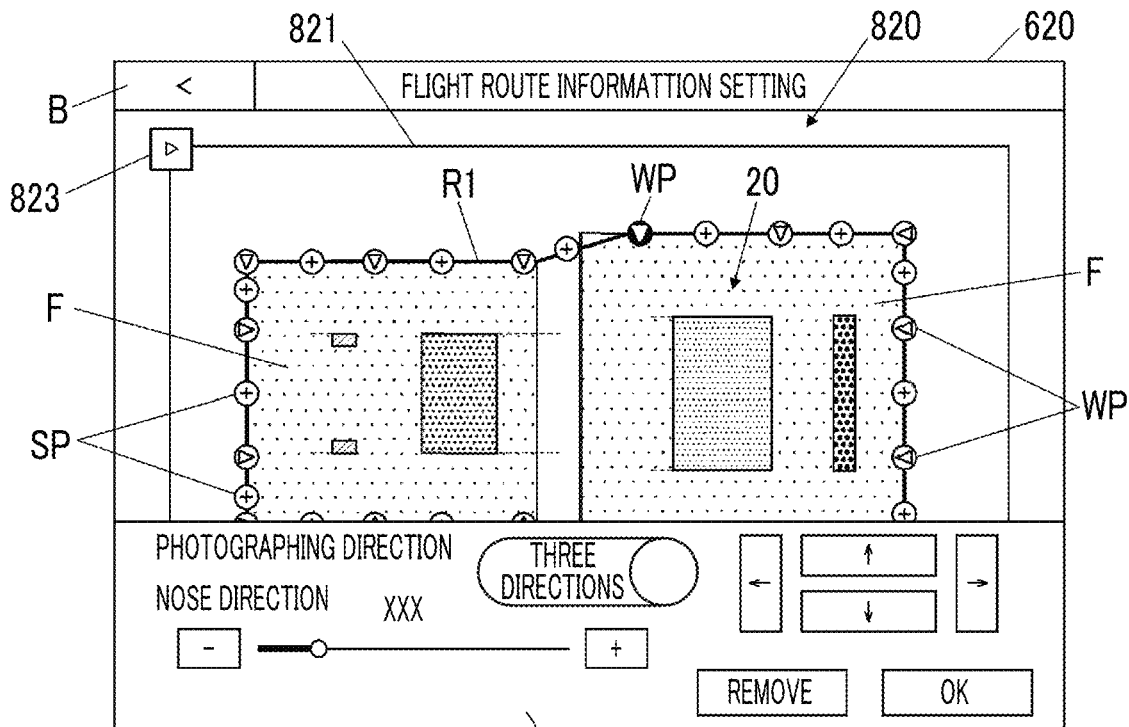
FIGS. 11A and 11B are diagrams illustrating a display example of the display in the route display processing.

In the present embodiment, the photographing conditions at the waypoints WP can be edited by activating the waypoints WP, which are also photographing points. Specifically, as illustrated in FIG. 11A, when the waypoint WP is activated, the photographing point editing window 825 showing the photographing conditions of the waypoint WP is pop-up displayed. By operating the photographing point editing window 825, it is possible to edit the photographing conditions of the desired waypoint WP. In the photographing point editing window 825 of the present embodiment, for example, setting the photographing direction (1 to 3 directions), setting a nose direction at the time of photographing, setting the photographing point (adjusting upward/downward/leftward/rightward), and deleting the photographing point can be performed. In addition, the addition and movement of the photographing points may be performed in the same manner as the above-described change operation of the waypoint WP.

Figure 11B:
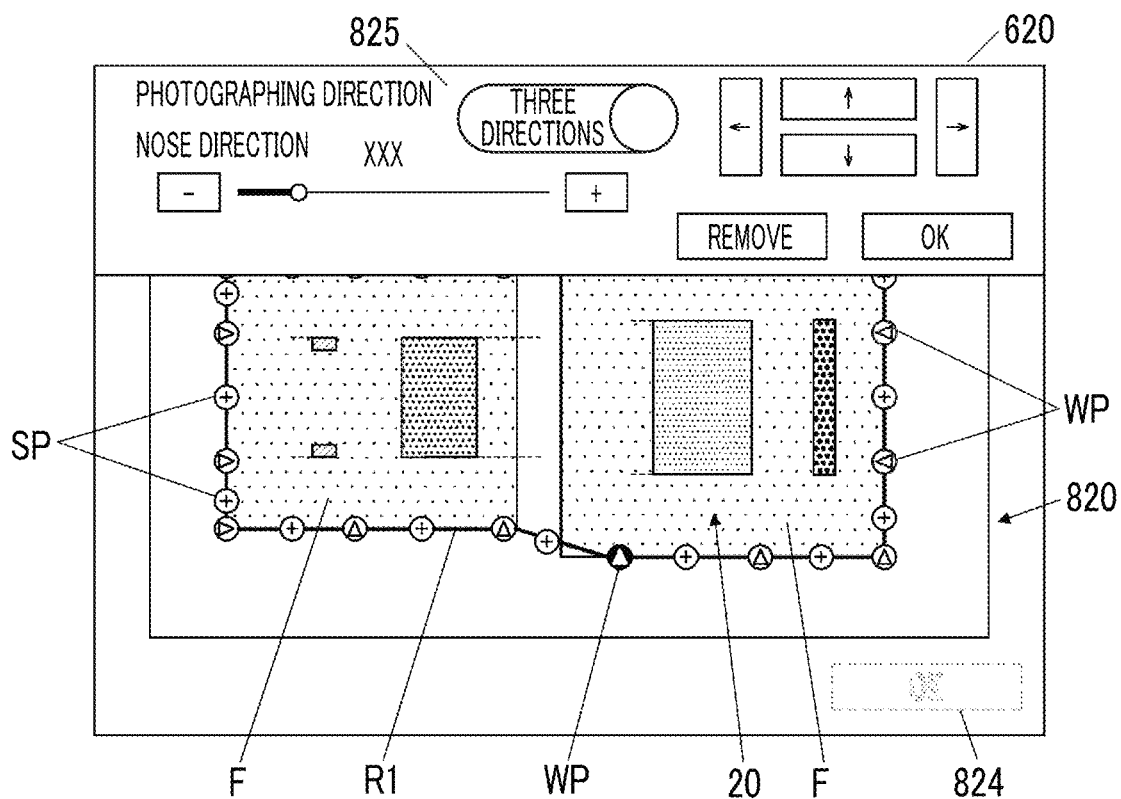

The photographing point editing window 825 is displayed so as not to overlap the waypoint WP to be edited. For example, when the waypoint WP at a lower side of the screen is activated, the photographing point editing window 825 is displayed at an upper side of the screen as illustrated in FIG. 11B.

In a case where it is determined in step S8 that the operation of changing the photographing point is not performed (step S8; No), the control unit 65 shifts the process to step S3 described above and transitions the display content of the display 620 on the entire route display screen 810 (refer to FIG. 8A).

In the present embodiment, when an OK button 824 or a back button B is operated on the partial route display screen 820, the screen switches to the entire route display screen 810.

On the other hand, in a case where it is determined in step S4 described above that the operation of editing the partial route R1 is not performed (step S4; No), the control unit 65 determines whether or not the flight point selection operation is performed on the entire route display screen 810 (step S10).

Figure 12A:
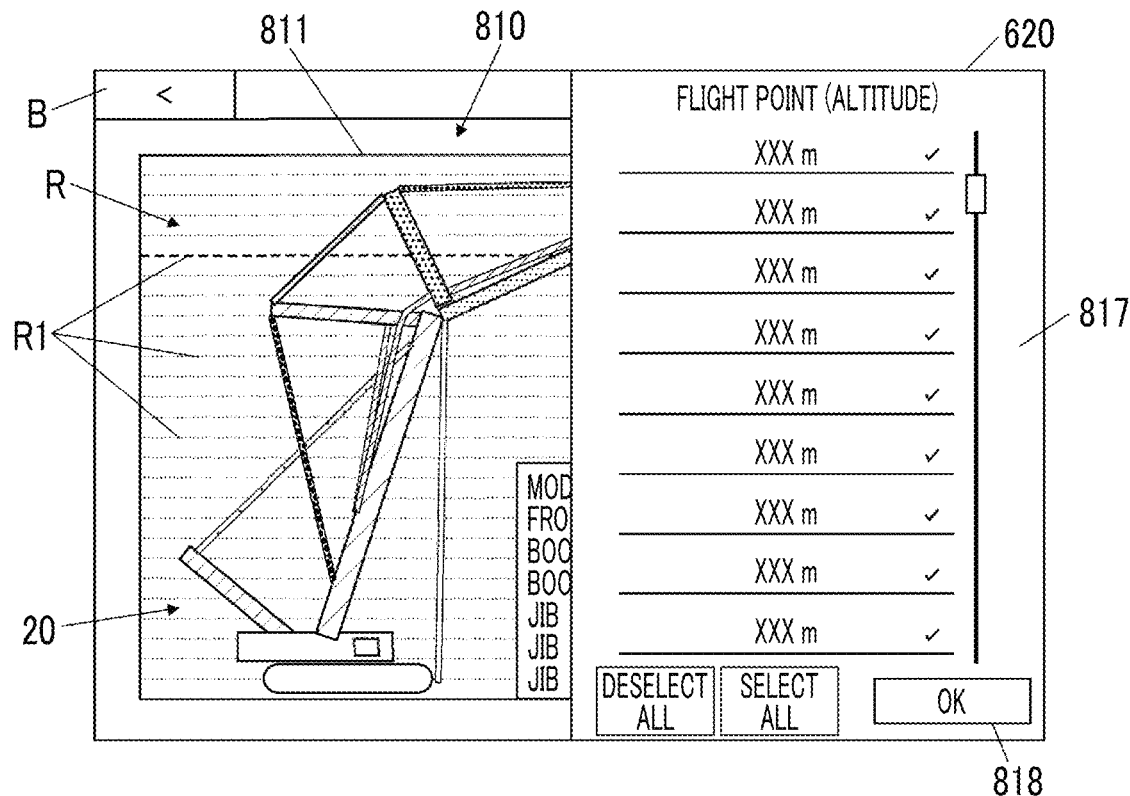
FIGS. 12A and 12B are diagrams illustrating a display example of the display in the route display processing.

When the flight point selection button 815 is operated by the user, the control unit 65 determines that the flight point selection operation has been performed (step S10; Yes), as illustrated in FIG. 12A, a flight point selection window 817 is pop-up displayed on the entire route display screen 810 (step S11). In the flight point selection window 817, an altitude of the flight point (partial route R1) is displayed in a list together with the selection display (check mark in the drawing).

Next, the control unit 65 determines whether or not an operation of changing (selecting or deselecting) the flight point is performed (step S12).

In a case where it is determined that the operation of changing the flight point has been performed (step S12; Yes), the control unit 65 selects or deselects the flight point (partial route R1) according to the operation (step S13). After that, the control unit 65 shifts the process to step S11 described above.

Figure 12B:
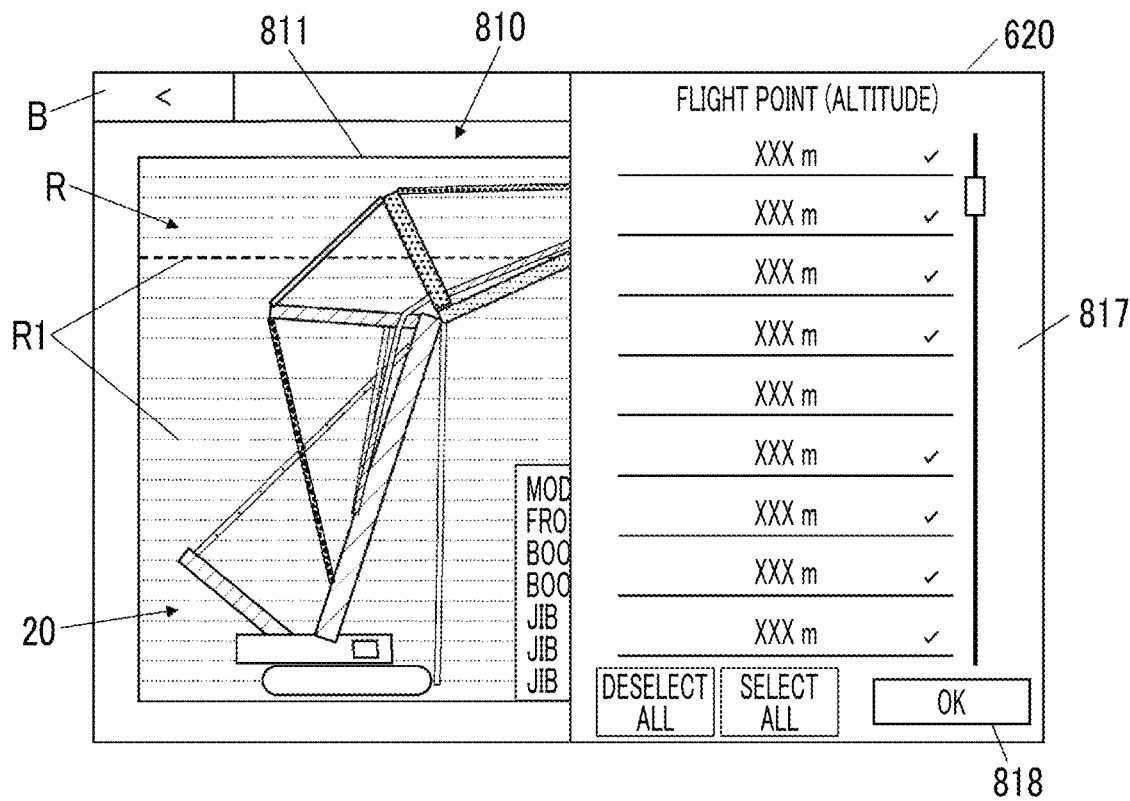

For example, as illustrated in FIG. 12B, when a check mark of a certain flight point is removed by the user in the flight point selection window 817, the partial route R1 corresponding to this flight point is deleted from the flight route R, and it is erased from the main window 811.

In a case where it is determined in step S12 that the operation of changing the flight point is not performed (step S12; No), the control unit 65 shifts the process to the above-described step S3 and displays the entire route display screen 810 (refer to FIG. 8A).

In the present embodiment, when the user operates the OK button 818 of the flight point selection window 817, the flight point selection window 817 is closed and the entire route display screen 810 is displayed.

On the other hand, in a case where it is determined in step S10 that the flight point selection operation is not performed (step S10; No), the control unit 65 confirms a flight plan based on the user operation (step S14).

In the present embodiment, when the user operates the complete button 816 of the entire route display screen 810, the control unit 65 switches the display content of the display 620 from the entire route display screen 810 to a flight plan confirmation screen (not illustrated).

Here, as a flight plan, for example, the number of times of photographing, the photographing time, and the like are set by the user.

Next, the control unit 65 receives the flight start operation by the user, starts the flight of the moving body 40 (step S15), and causes the moving body 40 to fly along the set flight route R.

It is preferable that a flight order of the flight route R is first flying the lowest layer of the partial route R1, ascending to the top layer, and sequentially descending while moving from the top layer of the partial route R1 to the second lowest layer of the partial route R1 (refer to FIG. 13A). In this way, first, it is possible to confirm that the flight route R does not come into contact with the crane 20 by flying the lowest layer of the partial route R1 once to confirm the distance, and then flying the top layer (above the crane 20). Once the confirmation at the lowest layer and the top layer is performed, it is possible to confirm whether or not a center position and the settings are correct. In addition, even if the moving body 40 falls due to the exhaustion of a remaining power source during the flight, a falling altitude can be kept low by going around a high place at an early stage when the remaining power source (for example, battery) of the moving body 40 is large after confirming the safety of the lowest level.

At this time, the control unit 44 of the moving body 40 acquires the captured image data and the detection data during the flight, and transmits the diagnostic information data including the captured image data and the detection data to the information terminals 60 and 70 and the management server 50. The management server 50 performs diagnostic processing for determining a presence or absence of an abnormality in a predetermined inspection location of the crane 20 based on the received diagnostic information data. The information terminals 60 and 70 may execute this diagnostic processing.

Figure 14A:
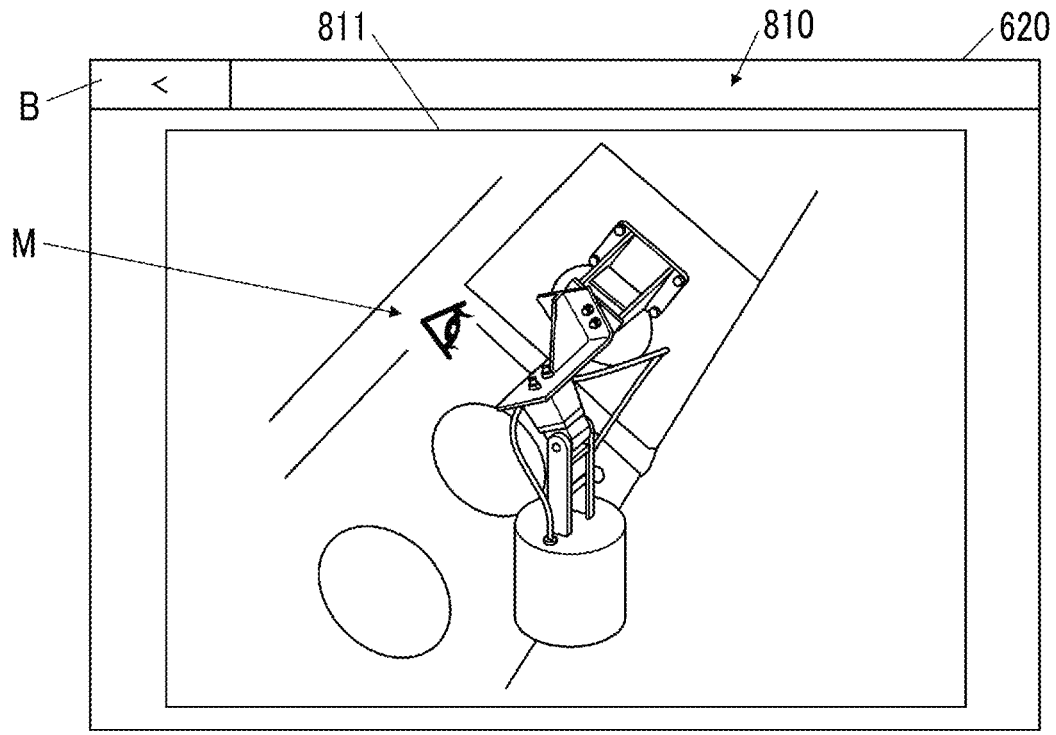
FIGS. 14A and 14B are diagrams illustrating a display example of the display in the route display processing.
Figure 14B:
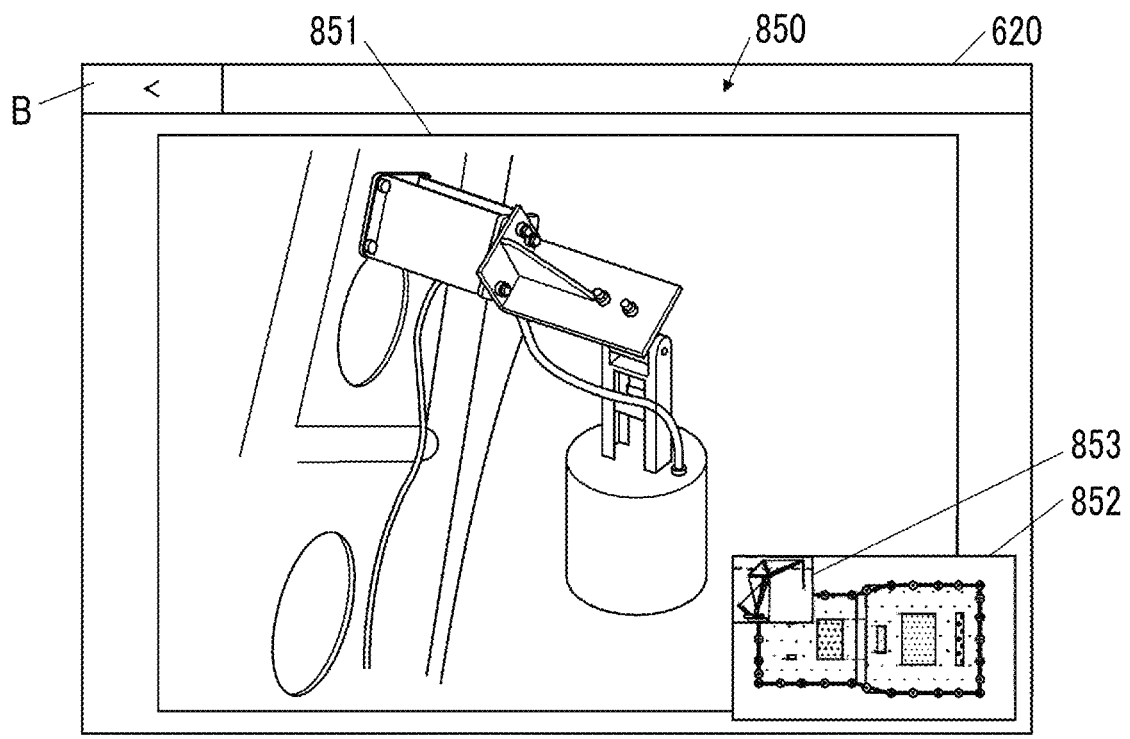

At this time, as illustrated in FIG. 14B, the control unit 65 displays a live view screen 850 on the display 620 and displays a video photographed with the camera 41 in the live view. On the live view screen 850, the video photographed with the camera 41 is displayed in the live view on the main window 851, and the setting screen (partial route display screen) of the partial route R1 during the flight is displayed on the sub-window 852 at the right corner of the display 620. In a second sub-window 853 in the sub-window 852, the appearance of the crane and the height position of the partial route R1 during the flight are displayed. The second sub-window 853 may be displayed as a separate window outside the sub-window 852.

After that, when the flight of the moving body 40 along the flight route R has ended (step S16), the control unit 65 stops the moving body 40 at a predetermined position and ends the route display processing.

In step S3 described above, although the crane appearance and the flight route R are displayed two-dimensionally on the entire route display screen 810, the crane appearance and the flight route R may be three-dimensionally displayed as illustrated in FIG. 13A.

In this case, the control unit 65 reads out the three-dimensional CAD data 643 of the crane 20 from the storage unit 64 and causes the main window 811 to three-dimensionally display the appearance of the crane. The displayed crane 20 and flight route R can be integrally operated (enlargement/reduction, rotation around an arbitrary axis, and the like) by the user operation.

Figure 13B:
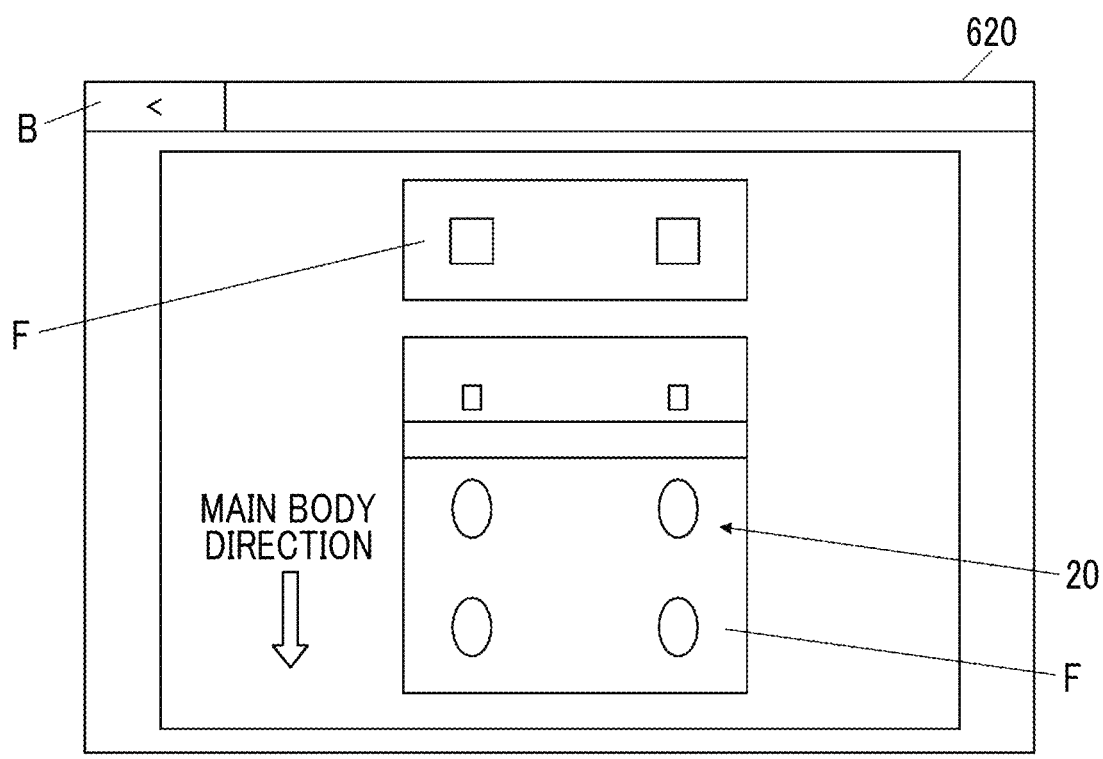

When the user selects any of the partial routes R1, as illustrated in FIG. 13B, the control unit 65 displays a cross section of the crane at the altitude of the selected partial route R1 in the same manner as the partial route display screen 820 displayed in step S5 described above. The selected partial route R1 may also be displayed on this screen.

In a case where the crane appearance and the flight route R are three-dimensionally displayed, additional photographing points may be set in detail.

For example, as illustrated in FIG. 14A, a base end part of the camera installed at the tip of the tower jib 25 becomes a blind spot and cannot be visually recognized (photographed) from the automatically generated partial route R1 that moves the surroundings of the crane. In this case, the three-dimensional model of the crane 20 is enlarged to display the corresponding location, and a desired photographing point (photographing direction) is set by a photographing direction mark M. The set photographing point is appropriately incorporated into, for example, the nearest partial route R1.

Accordingly, as illustrated in FIG. 14B, for example, the video of the photographing point (photographing direction) set by the photographing direction mark M is displayed on the live view screen 850 during the flight. Therefore, even a position that is a blind spot from the partial route R1 that simply moves the surroundings of the crane, it is possible to suitably visually recognize (photograph) the position.

Technical Effects of the Present Embodiment

As described above, according to the present embodiment, when the crane 20 and the flight route R are displayed on the display 620, the flight route R can be displayed in a display mode viewed from two different directions (for example, the entire route display screen 810 and the partial route display screen 820 in the present embodiment).

Accordingly, the flight route R of the moving body 40 can be easily and accurately confirmed and identified as compared with the related art in which the flight route is simply viewed from one direction.

According to the present embodiment, in the display mode (partial route display screen 820) on which the partial route R1 of the flight route R is displayed, the partial route R1 can be changed (set) based on the user operation.

Accordingly, the user can more accurately set a desired partial route R1 on the partial route display screen 820 on which the partial route R1 is displayed in detail.

According to the present embodiment, on the partial route display screen 820 displaying the partial route R1, a region where the moving body 40 cannot enter (flight prohibition area F) and a region where the moving body 40 can enter (for example, regions other than the flight prohibition area F) are displayed in a distinguishable manner.

Accordingly, the user can easily set a safe partial route R1.

According to the present embodiment, on the partial route display screen 820 displaying the partial route R1, the photographing point at which the moving body 40 performs photographing on the partial route R1 can be changed (set) based on the user operation.

Accordingly, the user can more accurately set a desired photographing point on the partial route display screen 820 on which the partial route R1 is displayed in detail.

According to the present embodiment, on the partial route display screen 820 displaying the partial route R1, a surface including the partial route R1 is displayed in a plane.

Accordingly, the user can confirm and identify the partial route R1 in detail.

According to the present embodiment, the crane 20 and the flight route R are configured to be integrally operated on the display 620 in a state where the crane 20 and the flight route R are three-dimensionally displayed.

Accordingly, the user can optionally change a display direction of the crane 20 and the flight route R, and can confirm the crane 20 and the flight route R from a desired direction.

Other

Although the embodiment of the present invention has been described above, the present invention is not limited to the above embodiment.

For example, in the above embodiment, the entire route display screen 810 (two-dimensional and three-dimensional) and the partial route display screen 820 have been described as examples of the display modes of the crane 20 and the flight route R. As long as the flight route can be displayed in the display mode viewed from at least two different directions, the display mode is not limited to that of the above embodiment.

Figure 15:
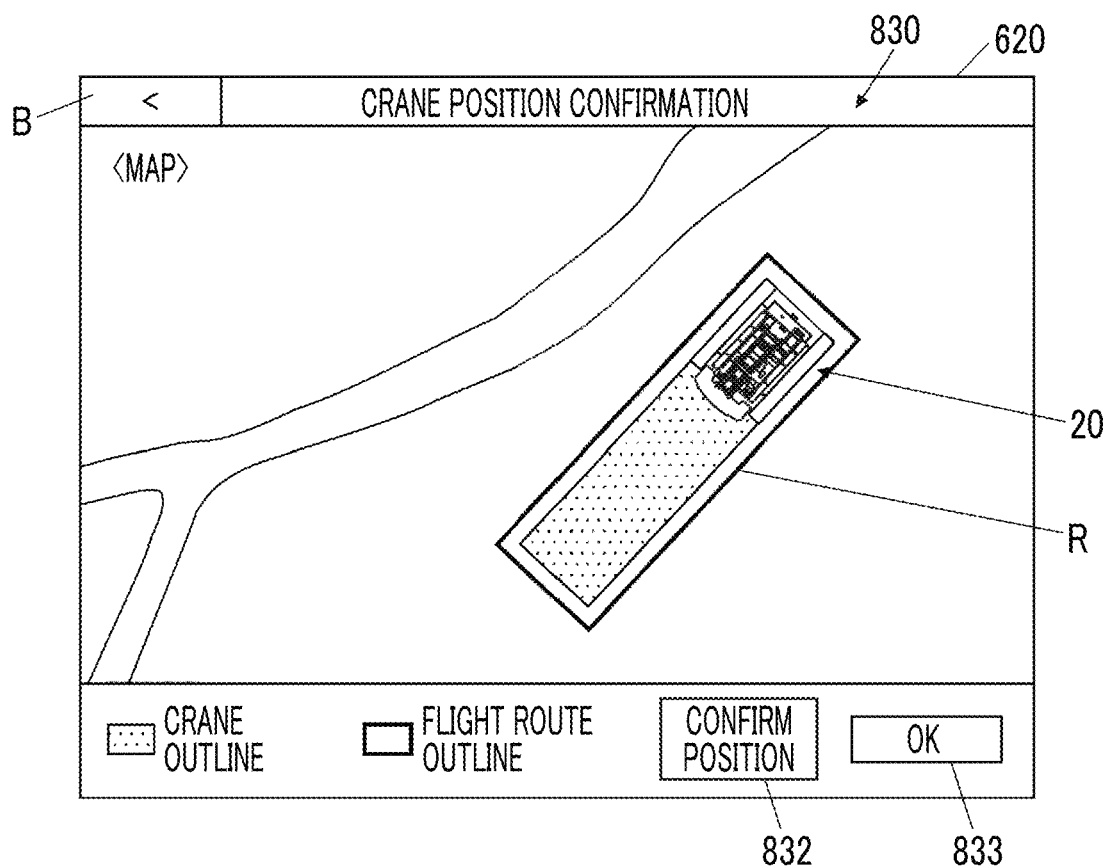
FIG. 15 is a diagram illustrating a display example of the display in the route display processing.

For example, as illustrated in FIG. 15, it may be possible to display a display mode in which the crane 20 and the flight route R are displayed in a plane on a map. An example in FIG. 15 is the position confirmation screen 830, and the position and direction of the crane 20 and the flight route R can be confirmed. For example, it is possible to confirm whether or not the crane 20 and the flight route R are out of a predetermined site by using the display on the map. The map information may be stored in the storage unit 64 in advance, or may be acquired from another terminal or the like via the network 130.

Whether it is a two-dimensional display or a three-dimensional display is irrelevant in the display modes viewed from two different directions. That is, the display mode includes, for example, not only a display mode in which the partial route R1 is displayed two-dimensionally, but also a display mode in which the partial route R1 is three-dimensionally displayed.

In the above embodiment, the flight route R of the moving body 40 has partial routes R1 in the horizontal plane for a plurality of layers. However, the flight route of the moving body 40 at the time of inspection is not particularly limited, and may include, for example, a route moving in a vertical plane or a route along with a boom or a jib.

In addition, in step S1 of the route display processing, the disposition state data of the crane 20 is acquired from the crane 20 in real time, and then in the step S3, the flight route of the moving body 40 is set based on the disposition state data acquired in real time. That is, the process of steps S1 and S3 may be performed at any time (for example, at regular time intervals). Accordingly, the flight route can be suitably set (changed) even while the crane 20 is in operation.

Furthermore, the route display in real time may be performed during the flight of the moving body 40 in step S15.

In the above embodiment, the route display processing is executed by the route display program 641 in the information terminal 60. The route display processing can be executed by any device capable of acquiring the disposition state data of the crane 20 and having computing power. Therefore, the display device according to the present invention includes the information terminals 60 and 70, the management server 50, and the crane 20 itself.

In the above embodiment, a mobile tower crane is exemplified as an example of the crane 20. However, the present invention is not limited thereto. In addition to a mobile crane such as a wheel crane, a truck crane, a rough terrain crane, and an all terrain crane, it is applicable to various cranes such as a tower crane, a ceiling crane, a jib crane, a retractable crane, a stacker crane, a portal type crane, and an unloader.

Furthermore, the present invention is applicable not only to a crane including the suspended load hook but also to a crane for suspending attachment such as a magnet and an earth drill bucket.

In the above embodiment, the crane 20 is an inspection (photographing) target of the moving body 40, and the present invention can be suitably applied to various photographing targets other than the crane. In addition to the crane, the photographing targets include rides such as a Ferris wheel and roller coasters, a windmill, an excavator, an airplane, and a ship. The present invention can also be applied to inspection of existing buildings.

The present invention is not limited to performing of inspection (diagnostic processing) based on an image, and can be applied to photographing that is not intended for inspection, for example, in a case where a captured image is displayed for an inspection operator.

In addition, details in the above-described embodiment can be appropriately changed within the scope not departing from the concept of the invention.

It should be understood that the invention is not limited to the above-described embodiment, but may be modified into various forms on the basis of the spirit of the invention. Additionally, the modifications are included in the scope of the invention.

What is claimed is:

1. A display device comprising:
a display; and
a controller configured to display a flight route of a flying object flying while photographing surroundings of a crane on the display,
wherein the flight route includes a plurality of partial routes,
the controller is configured to
display the crane and the flight route on the display, and
display the flight route in a display mode viewed from at least two different directions,
the display mode of the flight route includes a first mode in which a cross-section of the crane and one of the plurality of partial routes in the same plane as the cross-section are displayed,
the display mode of the flight route further includes a second mode in which an appearance of the crane and a plurality of layers respectively representing planes for the plurality of partial routes are displayed, and
when a specific layer of the plurality of layers displayed on the display is selected by a user in the second mode, the controller is configured to display the first mode showing the cross-section of the crane in a plane represented by the specific layer and the one of the plurality of partial routes in the plane represented by the specific layer on the display.

2. The display device according to claim 1,
wherein the controller is configured to change one of the plurality of partial routes based on a user operation in a state where the plurality of partial routes are displayed on the display.

3. The display device according to claim 2,
wherein the controller is configured to display a region where the flying object can enter and a region where the flying object cannot enter in a distinguishable manner when the plurality of partial routes are displayed on the display.

4. The display device according to claim 1,
wherein the controller is configured to set a photographing position where the flying object performs photographing on the partial route based on a user operation in a state where the plurality of partial routes are displayed on the display.

5. The display device according to claim 1,
wherein the display mode of the flight route further includes a third mode in which the crane and the flight route are three-dimensionally displayed.

6. The display device according to claim 5,
wherein the controller is configured to integrally operate the crane and the flight route on the display in the third mode.

7. A non-transitory computer readable medium storing a route display program that displays a flight route of a flying object flying while photographing surroundings of a crane on a display,
the program causing a computer to function as a display controller that
displays the flight route in a display mode viewed from at least two different directions, in a case in which the crane and the flight route are displayed on the display,
wherein the flight route includes a plurality of partial routes,
the display mode of the flight route includes a first mode in which a cross-section of the crane and one of the plurality of partial routes in the same plane as the cross-section are displayed,
the display mode of the flight route further includes a second mode in which an appearance of the crane and a plurality of layers respectively representing planes for the plurality of partial routes are displayed, and
when a specific layer of the plurality of layers displayed on the display is selected by a user in the second mode, the program causes the computer to display the first mode showing the cross-section of the crane in a plane represented by the specific layer and one of the plurality of partial routes in the plane represented by the specific layer on the display.

8. The display device according to claim 1,
wherein the controller is configured to
  acquire disposition state data of the crane, and
  set the flight route based on the disposition state data of the crane, and
the disposition state data of the crane includes information on a posture of the crane.

9. The display device according to claim 1,
wherein the controller is configured to
  acquire disposition state data of the crane, and
  set the flight route based on the disposition state data of the crane, and the disposition state data of the crane includes information on a direction of the crane.

10. The display device according to claim 1,
wherein the controller is configured to display a video photographed with the flying object together with the flight route on which the flying object is flying.

11. The display device according to claim 1,
wherein the controller is configured to display a photographing point at which the flying object on the flight route performs photographing, and
the photographing point is added by the user operating a button displayed on the display.

12. The display device according to claim 1,
wherein the crane includes a rotating platform, a tower boom that is attached to the rotating platform to be capable of derricking, and a tower jib that is attached to the tower boom to be capable of derricking, and
the controller is configured to set the flight route based on an angle of the tower jib and display the flight route on the display.

13. The display device according to claim 1,
wherein positions of the planes represented by the plurality of layers are set so as to be lined up in a height direction of the crane.

14. The display device according to claim 13,
wherein the controller is configured to set the flight route so that a plane of a lowest layer of the plurality of layers and a plane of a top layer of the plurality of layers are flown.

15. The display device according to claim 1,
wherein the display mode of the flight route further includes a fourth mode in which the crane and the flight route are displayed together with a map in a vertical direction.

16. The display device according to claim 1,
wherein in the first mode, a range within a predetermined distance to the crane is distinguishably displayed.

17. The display device according to claim 5,
wherein in the third mode, a three-dimensional model stored in advance is displayed.

\* \* \* \* \*